US012646482B2

(12) United States Patent
Yoshii

(10) Patent No.: US 12,646,482 B2
(45) Date of Patent: Jun. 2, 2026

(54) ELECTRO-OPTICAL DEVICE AND ELECTRONIC APPARATUS

(71) Applicant: SEIKO EPSON CORPORATION, Tokyo (JP)

(72) Inventor: Masahito Yoshii, Chitose (JP)

(73) Assignee: SEIKON EPSON CORPORATION, Tokyo (JP)

( * ) Notice: Subject to any disclaimer, the term of this patent is extended or adjusted under 35 U.S.C. 154(b) by 0 days.

(21) Appl. No.: 19/248,513

(22) Filed: Jun. 25, 2025

(65) Prior Publication Data

US 2026/0004754 A1 Jan. 1, 2026

(30) Foreign Application Priority Data

Jun. 28, 2024 (JP) ................................ 2024-104904

(51) Int. Cl.
*G09G 3/36* (2006.01)

(52) U.S. Cl.
CPC ... *G09G 3/3688* (2013.01); *G09G 2300/0814* (2013.01); *G09G 2310/0297* (2013.01); *G09G 2310/08* (2013.01)

(58) Field of Classification Search
CPC ......... G09G 3/3688; G09G 2300/0814; G09G 2310/0297; G09G 2310/08; G09G 3/3614; G09G 3/3648
See application file for complete search history.

(56) References Cited

U.S. PATENT DOCUMENTS 6,680,721 B2 * 1/2004 Murade ................ G09G 3/3674 345/94
11,587,523 B2 * 2/2023 Mochizuki ........... G09G 3/3688
2006/0087488 A1 * 4/2006 Ito ........................ G09G 3/2011 345/103
2008/0180374 A1 * 7/2008 Yoshimoto ........... G09G 3/3614 345/89
2012/0223876 A1 * 9/2012 Kitazawa ............. G09G 3/3233 345/84
2013/0127930 A1 * 5/2013 Nishio ................. G09G 3/3648 345/89
2016/0125820 A1 * 5/2016 Ito ........................ G09G 3/3685 345/99
2018/0090085 A1 * 3/2018 Enami .................. G09G 3/3655
2018/0158431 A1 * 6/2018 Fujikawa ............. G09G 3/3696

(Continued)

FOREIGN PATENT DOCUMENTS

JP 2007240830 9/2007

*Primary Examiner* — Amy Onyekaba
(74) *Attorney, Agent, or Firm* — JCIPRNET

(57) ABSTRACT

An electro-optical device includes data lines grouped into a set of three lines, a data signal line to which a data signal according to gradation of a pixel is supplied in a time-division manner, corresponding to the three data lines, selection signal lines to each of which a selection signal is supplied, inversion selection signal lines to each of which an inversion selection signal of the selection signal is sequentially supplied, the inversion selection signal lines forming pairs with the selection signal lines, a transistor being in an on state or an off state between the data line and the data signal line, according to a selection signal supplied to one selection signal line, and a light shielding film overlapping with the selection signal lines and the inversion selection signal lines in plan view and being maintained at a predetermined potential.

8 Claims, 10 Drawing Sheets

(56) References Cited

U.S. PATENT DOCUMENTS

| | | | | |
|---|---|---|---|---|
| 2020/0043392 | A1* | 2/2020 | Fujikawa | G09G 3/3688 |
| 2020/0105219 | A1* | 4/2020 | Fujikawa | G09G 3/3696 |
| 2021/0278735 | A1* | 9/2021 | Fujikawa | G09G 3/3688 |

* cited by examiner

ELECTRO-OPTICAL DEVICE AND ELECTRONIC APPARATUS

The present application is based on, and claims priority from JP Application Serial Number 2024-104904, filed Jun. 28, 2024, the disclosure of which is hereby incorporated by reference herein in its entirety.

BACKGROUND

1. Technical Field

The present disclosure relates to an electro-optical device and an electronic apparatus.

2. Related Art

In an electro-optical device by a demultiplexer system, data lines are grouped in sets of a plurality of lines. A data signal is supplied to a data signal line provided corresponding to each group. The data signal is distributed to each of the data lines by a switching element in an on state or an off state that is determined by a selection signal (see, for example, JP-A-2007-240830).

In such an electro-optical device, the selection signal is supplied via a selection signal line that extends in a direction intersecting with the data line. Further, in order to shield the selection signal line and the data signal line, a constant potential wiring line may be provided so as to overlap with the selection signal line, the data signal line, and the like in plan view.

However, noise caused by the potential fluctuation in the selection signal may be superimposed onto the constant potential wiring line. The constant potential wiring line is often shared with a constant potential line used in another element. Thus, the potential fluctuation caused by noise superimposed onto the constant potential wiring line may lead to a problem of, for example, degradation in display quality.

SUMMARY

In order to solve the above-mentioned problem an electro-optical device according to an aspect of the present disclosure includes a plurality of data lines including k data lines being grouped, k being an integer equal to or greater than 2, a data signal line to which a data signal according to gradation of a pixel is supplied, in a time-division manner, corresponding to the k data lines, k selection signal lines to each of which a selection signal is supplied, k inversion selection signals to each of which an inversion selection signal of the selection signal is supplied, the k inversion selection signal lines forming pairs with the k selection signal lines, a first switching element being provided corresponding to the plurality of data lines in an one-on-one manner, being in an on state or an off state between the data signal line and one data line, according to a selection signal supplied to one selection signal line among the k selection signal lines, and a constant potential wiring line overlapping with the k selection signal lines and the k inversion selection signal lines in plan view and being maintained at a predetermined potential.

DESCRIPTION OF EMBODIMENTS

Hereinafter, a projection display device according to an embodiment is described with reference to the drawings. In each drawing, dimensions and scales of respective portions are appropriately different from actual ones. Further, since embodiments to be described below are preferred specific examples, various technically preferable limitations are applied, but the scope of the present disclosure is not limited to these embodiments unless it is otherwise stated in the following description that the present disclosure is limited.

Figure 1:
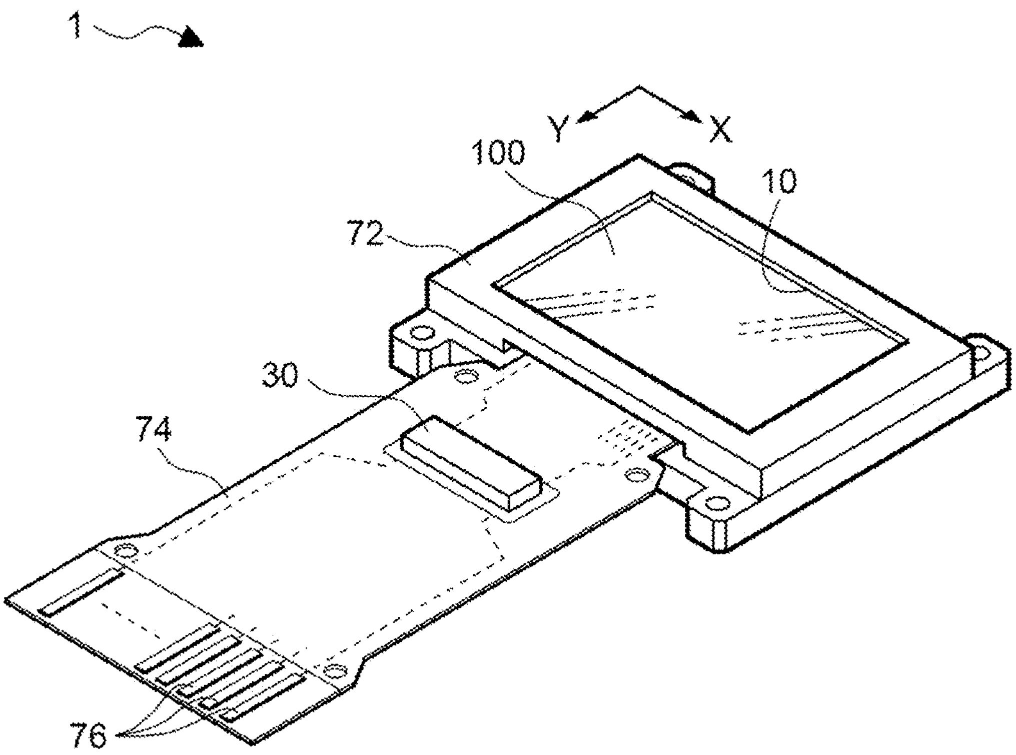
FIG. 1 is a perspective view illustrating an electro-optical device according to a first embodiment.

FIG. 1 is a perspective view illustrating a configuration of a module 1 including an electro-optical device 100 according to a first embodiment.

The electro-optical device 100 is a transmissive liquid crystal panel used as a light bulb of a projection-type display apparatus, for example. The electro-optical device 100 is accommodated in a frame-shaped case 72 that opens in a display region 10 having a rectangular shape. One end of an FPC substrate 74 is coupled to the electro-optical device 100. Note that FPC is an abbreviation for flexible printed circuits. A plurality of terminals 76 are provided on the other end of the FPC substrate 74, and are coupled to an upper circuit, which is omitted in illustration.

A display control circuit 30 of a semiconductor chip is mounted on the FPC substrate 74 by face-down bonding. Video data is synchronized with a synchronization signal, and is supplied from the upper circuit to the FPC substrate 74 via the plurality of terminals 76 are supplied. The video data defines gradation of the pixel in the image to be displayed, for example, in 8 bits.

Note that, in the drawing, an X direction is a longitudinal direction of the display region 10, and is an extension direction of a scanning line. A Y direction is a short direction of the display region 10, and is an extension direction of a data line.

When the electro-optical device 100 is used as a light bulb of a projection-type display apparatus, transmitted images by three electro-optical devices 100 corresponding to the primary colors R (red), G (green), and B (blue) are synthesized, and thus a color image is expressed as described later.

Therefore, a pixel which is a minimum unit of a color image can be divided into a red sub-pixel by an electro-optical device corresponding to R, a green sub-pixel by an electro-optical device corresponding to G, and a blue sub-pixel by an electro-optical device corresponding to B. However, when there is no need to specify the colors of the red, green and blue sub-pixels, or, for example, when only brightness is of concern, there is no need to intentionally use the term sub-pixel. In view of this, in the present description, the red, green, and blue sub-pixels are simply described as "pixels".

The synchronization signal includes a vertical synchronization signal for instructing the start of vertical scanning with respect to the pixels arrayed in the display region 10, a horizontal synchronization signal for instructing the start of horizontal scanning with respect to the pixels, and a clock signal indicating a timing for one pixel of the video data. The display control circuit 30 processes the video data and the synchronization signal, and outputs a data signal and a control signal that are required for driving the electro-optical device 100. The data signal is a signal obtained by converting the video data into an analog signal, and the control signal is a signal for controlling vertical scanning and horizontal scanning in the electro-optical device 100.

Note that, instead of a configuration in which the display control circuit 30 is mounted on the FPC substrate 74, there may be provided a configuration in which the display control circuit 30 is mounted on the upper circuit to supply the video signal and the control signal via the terminal 76.

Figure 2:
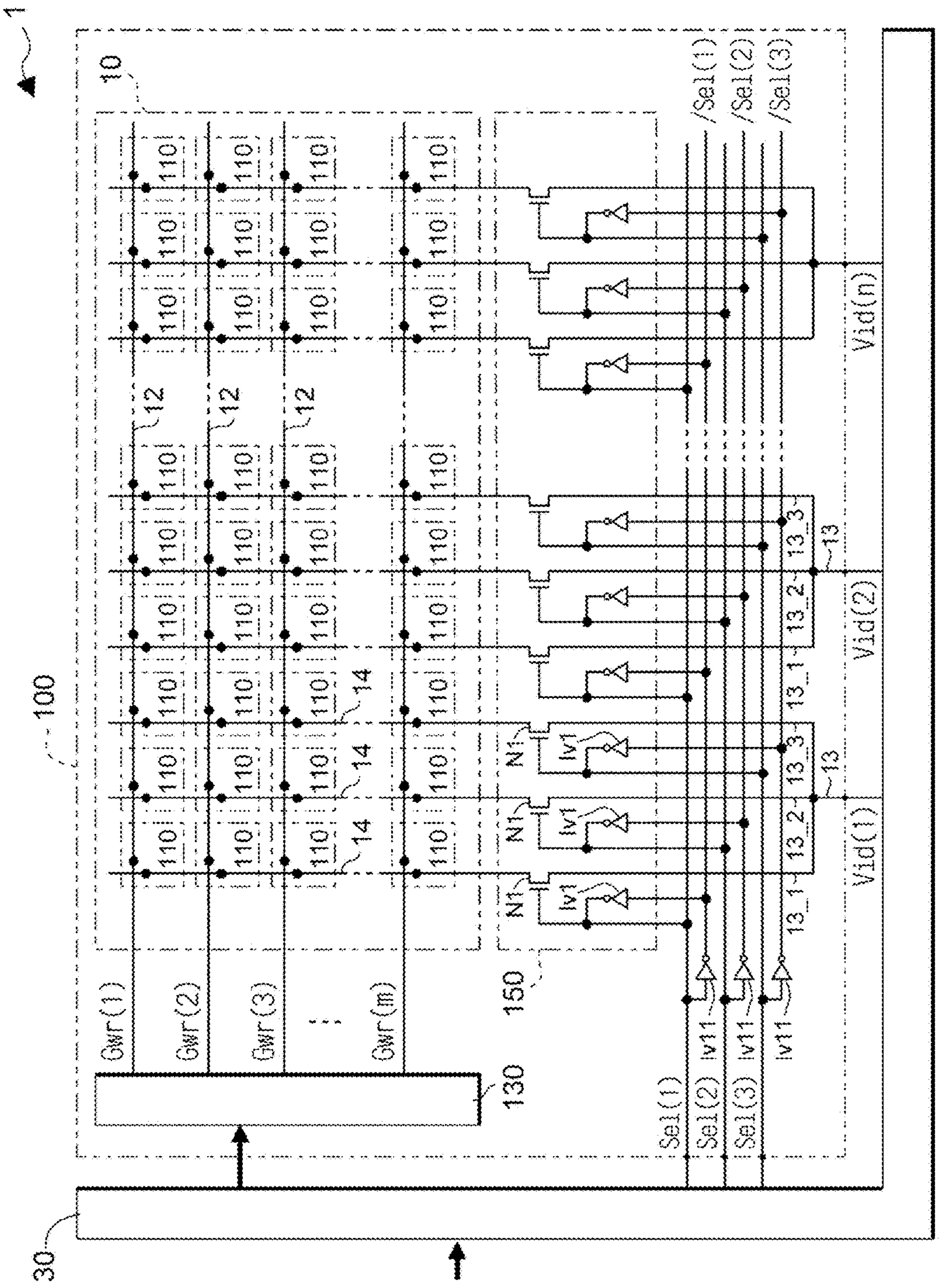
FIG. 2 is a block diagram illustrating a configuration of an electro-optical device.

FIG. 2 is a block diagram illustrating an electrical configuration of the module 1. The module 1 includes the electro-optical device 100 and the display control circuit 30 described above. In the peripheral edge of the display region 10 of the electro-optical device 100, a scanning line driving circuit 130 and a peripheral circuit 150 are provided.

The electro-optical device 100 includes a configuration in which a liquid crystal is sealed between an element substrate at which a thin film transistor or the like is formed and a counter substrate at which a common electrode is formed, and the scanning line driving circuit 130 are the peripheral circuit 150 formed at the element substrate.

In the display region 10 of the electro-optical device 100, pixel circuits 110 corresponding to pixels of an image to be displayed are arrayed in the matrix. In detail, in the display region 10, m scanning lines 12 are provided to extend in a horizontal direction in the drawing, and (3n) data lines 14 in total that are grouped in every three lines are provided to extend in a vertical direction in the drawing and to be electrically insulated from the scanning lines 12. Further, the pixel circuits 110 are provided corresponding to intersections between the M scanning lines 12 and the (3n) data lines 14. Therefore, in the embodiment, the pixel circuits 110 are arranged in a matrix with m vertical rows×(3n) horizontal columns.

Herein, m is an integer equal to or greater than 2. n is an integer equal to or greater than 2. Note that, in the embodiment, it is assumed that m<(3n).

To generalize and describe the rows of the scanning lines 12 and the rows in the pixel circuits 110 in a matrix array, an integer i equal to or greater than 1 and equal to or less than m is used. For example, the scanning lines 12 may be referred to as first, second, third, . . . , (i−1)-th, i-th, . . . , (m−1)-th, and m-th rows in order from the top in the drawing.

Similarly, to generalize and describe the columns of the data lines 14 and the columns in the pixel circuits 110 in a matrix array, an integer j equal to or greater than 1 and equal to or less than n is used. For example, to distinguish the data lines 14, the columns may be referred to as first, second, third, . . . , (3j−2)-th, (3j−1)-th, (3j)-th, . . . , (3n-2)-th, (3n-1)-th, and (3n)-th columns from the left in the drawing.

For the sake of convenience of the description, a configuration of the pixel circuit 110 is described with reference to FIG. 3.

Figure 3:
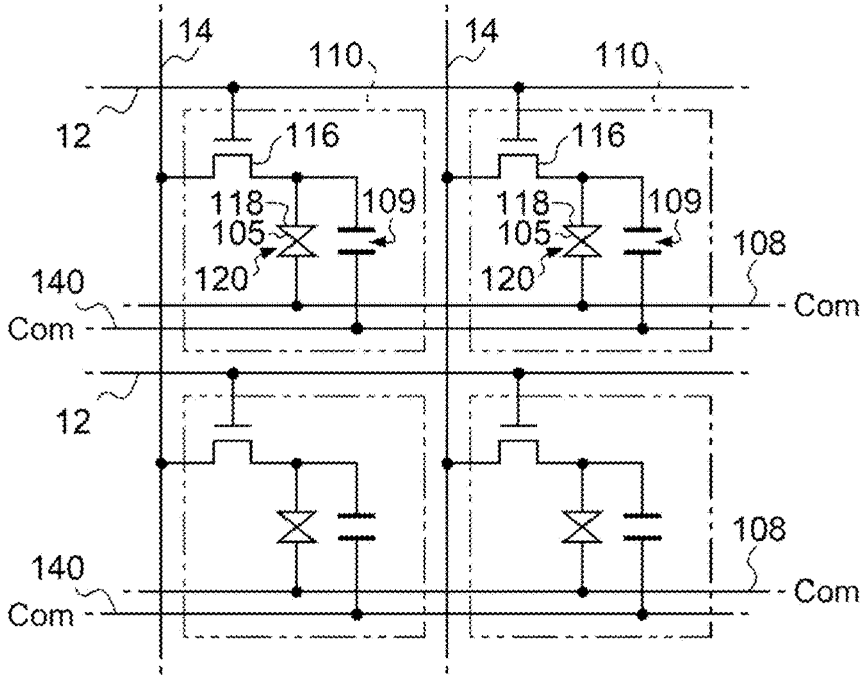
FIG. 3 is a diagram illustrating a configuration of a pixel circuit in the electro-optical device.

FIG. 3 is a diagram illustrating an equivalent circuit of a total of four of the pixel circuits 110, in two rows and two columns, corresponding to the intersections between two of the adjacent scanning lines 12 and two of the adjacent data lines 14.

As illustrated in the drawing, the pixel circuit 110 includes a transistor 116 and a liquid crystal element 120. The transistor 116 is, for example, an N-channel thin film transistor. In the pixel circuit 110, the transistor 116 has a gate node coupled to the scanning line 12, a source node coupled to the data line 14, and a drain node coupled to the pixel electrode 118 and one end of a storage capacitor 109.

In the present description, the term "couple" means direct or indirect coupling or coupling between two or more elements, and includes, for example, coupling between two or more elements via different wiring layers and contact holes even when the two or more elements are not directly coupled in a semiconductor substrate.

The common electrode 108 is provided in common to all of the pixel circuits 110 at the counter substrate to face the pixel electrode 118. The common electrode 108 is maintained at a substantially constant potential Ccom over time. Then, a liquid crystal 105 is interposed between the pixel electrodes 118 and the common electrode 108. Therefore, for each of the pixel circuits 110, the liquid crystal element 120 is configured by the pixel electrode 118, the common electrode 108, and the liquid crystal 105.

The storage capacitor 109 is electrically parallel to the liquid crystal element 120, and includes the other end coupled to a capacitance wiring line 140. The capacitance wiring line 140 is maintained at a constant potential over time, for example, at the potential Ccom that is the same as the common electrode 108.

Referring back to the description in FIG. 2, in the embodiment, the (3n) data lines 14 are grouped in every three lines. In a j-th group counted from the left, three data lines 14 correspond to the (3j−2)-th, the (3j−1)-th, and the (3j)-th columns.

Further, with regard to the data lines 14 or columns, the (3j−2)-th column in the j-th group may be referred to as a first series, the (3j−1)-th column as a second series, and the (3j)-th column as a third series. In other words, in the j-th group, the data line 14 in the first series corresponds to the (3j−2)-th column, the data line 14 in the second series corresponds to the (3j−1)-th column, the data line 14 in the third series corresponds to the (3j)-th column.

The display control circuit 30 processes the video data and the synchronization signal that are supplied from the upper circuit, and outputs the control signal to the scanning line driving circuit 130 and also outputs data signals Vid(1), Vid(2), Vid(3), . . . , Vid(n) and selection signals Sel(1) to Sel(3).

The data signals Vid(1), Vid(2), Vid(3), . . . , Vid(n) are supplied to the electro-optical device 100 via the n data signal lines 13. The data signals Vid(1), Vid(2), Vid(3), . . . , Vid(n) are generalized and described. The data signal Vid(j) is a signal at a potential according to gradation of the three pixels corresponding to the intersections between the three data lines 14 belonging to the j-th group and the scanning lines 12 subjected to horizontal scanning. In detail, the potential of the data signal Vid(j) changes in a time-division manner according to the gradation of the three pixels during the horizontal scanning period.

The selection signal Sel(1) is a signal for selecting the data line 14 in the first series. Similarly, the selection signal Sel(2) is a signal for selecting the data line 14 in the second series, and the selection signal Sel(3) is a signal for selecting the data line 14 in the third series. Each of the logic levels of the selection signals Sel(1) to Sel(3) is inverted by a NOT circuit Iv11, and the selection signals Sel(1) to Sel(3) are output sequentially as inversion selection signals/Sel(1) to/Sel(3), respectively.

Note that the selection signals Sel(1) to Sel(3) are supplied individually to the selection signal lines extending in the X direction, and the inversion signals being the inversion selection signals/Sel(1) to/Sel(3) are similarly supplied individually to inversion selection signal lines extending in the X direction.

Inversion refers to a relationship in which logic levels of logic signals that form a pair are reversed. The inversion selection signal is a signal whose logic level is the inverse of that of the selection signal. When the inversion selection signal is generated by inverting the selection signal by the NOT circuit, the inversion selection signal involves a time delay with respect to the selection signal. However, as described later, when noise caused by the selection signal can be canceled out by noise caused by the inversion selection signal, the time delay is not an issue.

Under control of the display control circuit 30, the scanning line driving circuit 130 supplies scanning signals individually to the scanning lines 12 in the m rows. Here, the scanning signal supplied to the scanning line 12 in the first row is denoted with Gwr(1). Similarly, the scanning signals supplied to the scanning line 12 in the second, third, . . . , (i−1)-th, i-th, . . . , (m−i)-th, and m-th rows are denoted with Gwr(2), Gwr(3), . . . , Gwr(i−1), Gwr(i), . . . , Gwr(m−1), and Gwr(m), respectively.

The display control circuit 30 outputs various control signals for controlling the scanning line driving circuit 130. However, the control signals supplied to the scanning line driving circuit 130 are not important in this application. Thus, only the signal paths are illustrated, and description for details of the above-mentioned controls signals is omitted.

The peripheral circuit 150 is a circuit (demultiplexer) that distributes the data signals, which are supplied to the data signal line 13, to the respective data lines 14 according to the selection signals Sel(1) to Sel(3). In detail, the peripheral circuit 150 includes a transistor N1 and a NOT circuit Iv1 for the data line 14 in one column.

The transistor N1 is an N-channel thin transistor similar to the transistor 116 in the pixel circuit 110. The transistor N1 and the NOT circuit Iv1 are described while focusing on the j-th group.

The data signal Vid(j) is supplied to the data signal line 13 corresponding to the j-th group. The data signal line 13 is split sequentially into three lines, specifically, data signal lines 13_1, 13_2, and 13_3.

In the j-th group, the transistor N1 in the first series includes an input end coupled to the data signal line 13_1 and an output end coupled to the j-th data line 14 in the first series.

In the j-th group, the NOT circuit Iv1 in the first series re-inverts the logic level of the inversion selection signal/Sel(1), and outputs the resultant signal. The selection signal Sel(1) and the inversion signal of the inversion selection signal/Sel(1) are merged and supplied to the gate node of the j-th transistor N1 in the first series.

In the j-th group, the transistor N1 in the second series includes an input end coupled to the data signal line 13_2 and an output end coupled to the j-th data line 14 in the second series.

In the j-th group, the NOT circuit Iv1 in the second series re-inverts the logic level of the inversion selection signal/Sel(2), and outputs the resultant signal. The selection signal Sel(2) and the inversion signal of the inversion selection signal/Sel(2) are merged and supplied to the gate node of the j-th transistor N1 in the second series.

Similarly, in the j-th group, the transistor N1 in the third series includes an input end coupled to the data signal line 13_3 and an output end coupled to the j-th data line 14 in the third series.

In the j-th group, the NOT circuit Iv1 in the third series re-inverts the logic level of the inversion selection signal/Sel(3), and outputs the resultant signal. The selection signal Sel(3) and the inversion signal of the inversion selection signal/Sel(3) are merged and supplied to the gate node of the j-th transistor N1 in the third series.

Note that FIG. 2 is a diagram for describing an electrical configuration of the electro-optical device 100 for better understanding. Next, in view of this, an actual arrangement of the respective elements in the electro-optical device 100 is described.

Figure 4:
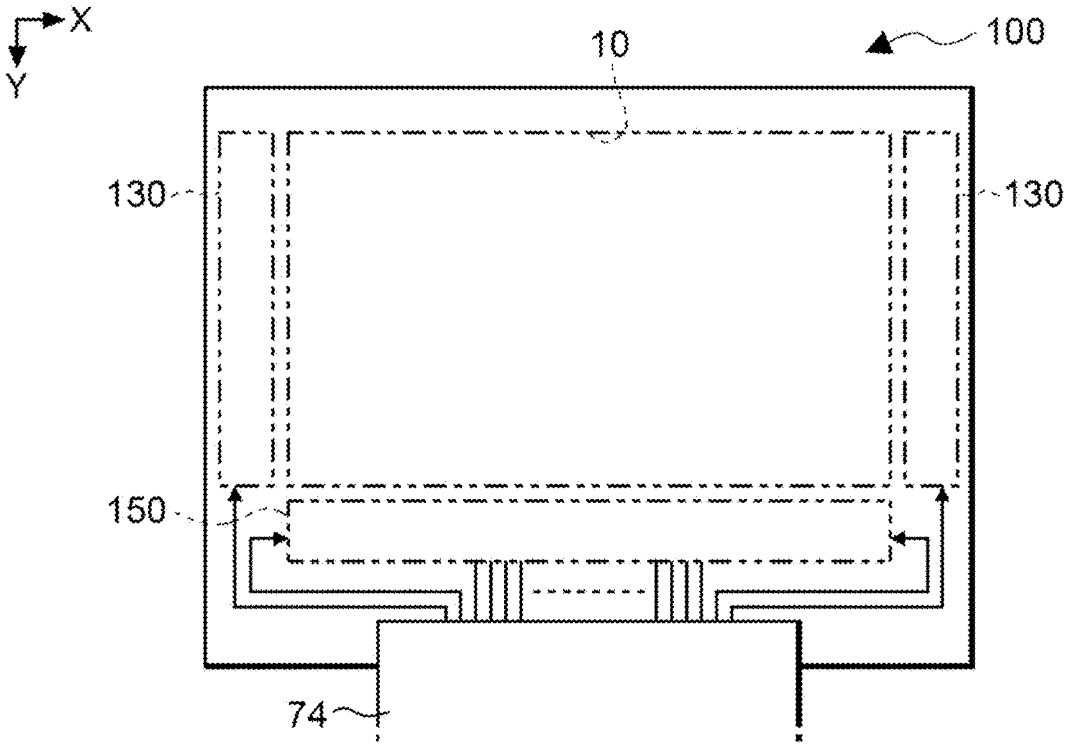
FIG. 4 is a plan view illustrating an arrangement of respective units in the electro-optical device.

FIG. 4 is a plan view illustrating an arrangement of the respective elements, in particular, an arrangement at the element substrate in the electro-optical device 100.

The one end of the FPC substrate 74 is coupled to the one side of the electro-optical device 100 in the longitudinal direction as described above. Between the one end of the FPC substrate 74 and the display region 10, the peripheral circuit 150 is provided.

The scanning line driving circuit 130 is provided outside of each of two sides of the display region 10 in the Y direction. There is adopted a configuration in which the two scanning line drive circuits 130 are provided and the scanning signal is supplied from both the ends of the scanning line 12. The reason for this configuration is to suppress an influence of a delay of the scanning signal on display as compared to a case in which the scanning signal is supplied from only one end.

Note that the same control signal is supplied from the display control circuit 30 to the two scanning line driving circuits 130. Further, the selection signals Sel(1) to Sel(3) are supplied from the left end in FIG. 2. However, as illustrated in FIG. 4, the selection signals Sel(1) to Sel(3) are supplied from both the right and left ends similarly to the scanning signal so as to suppress an influence of a delay. Similarly, the NOT circuit Iv11 is also provided to each of the right and left ends. Thus, the inversion selection signals/Sel (1) to/Sel(3) are also supplied from both the right and left ends.

Figure 5:
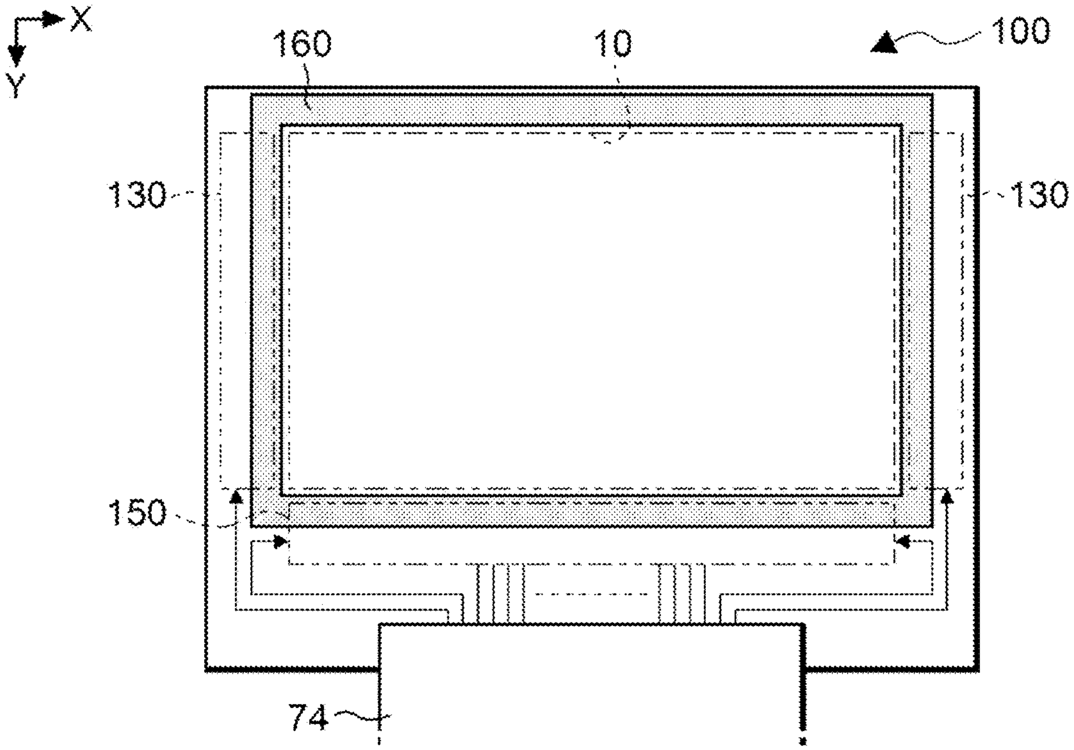
FIG. 5 is a diagram illustrating an arrangement of a light shielding film in the electro-optical device.

FIG. 5 is a plan view illustrating an arrangement of a light shielding film 160 in the electro-optical device 100.

The light shielding film 160 defines the display region 10. The light shielding film 160 is provided to surround the display region 10 in plan view so that entry of light into the scanning line driving circuit 130, the peripheral circuit 150, and the like is prevented. The expression "surround in plan view" refers to covering the outer region of the display region 10, which is a target to be surrounded, in a frame-like manner in plan view.

Further, a constant potential is applied to the light shielding film 160 so as to shield the data signal line 13 before splitting and the data signal lines 13_1, 13_2, and 13_3 after splitting.

In other words, the light shielding film 160 overlaps with the data signal lines 13, 13_1, 13_2, and 13_3 in plan view so as to shield those signal lines.

Note that, in the present description, the term "plan view" is to view one of the element substrate and the counter substrate from the other one.

In the embodiment, the light shielding film 160 is electrically coupled to the capacitance wiring line 140 that commonly couples the other ends of the storage capacitors 109, and is maintained at a potential Com. Note that the wiring layer forming the capacitance wiring line 140 in the display region 10 and the wiring layer forming the light shielding film 160 outside the display region 10 may be different from each other, or may be the same. In any case, the light shielding film 160 may be a wiring layer that is non-transparent to light and electrically conductive, specifically, using a material such as aluminum and titanium nitride.

Figure 6:
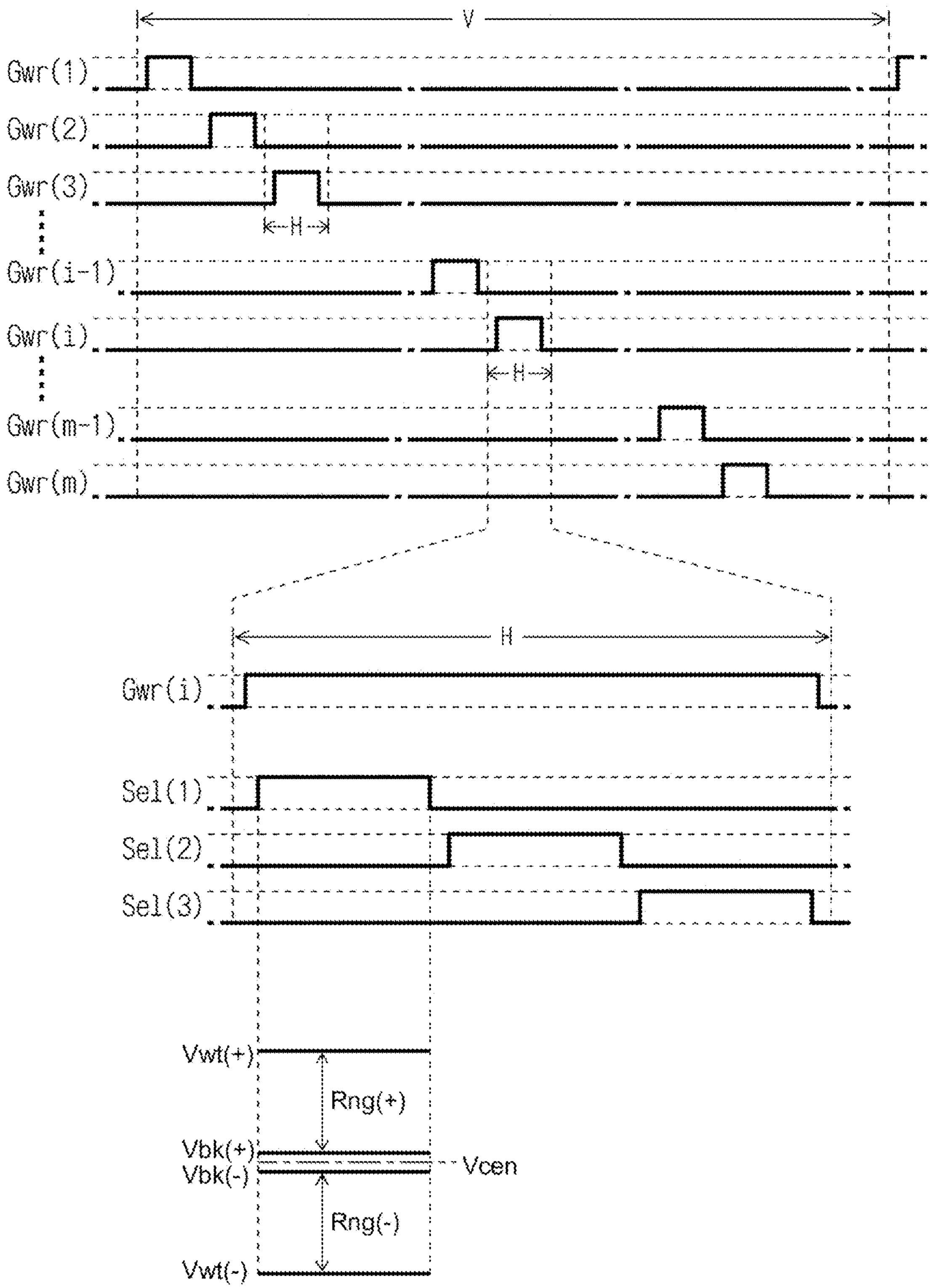
FIG. 6 is a diagram illustrating an operation of the electro-optical device.

FIG. 6 is a timing chart illustrating an operation of the electro-optical device 100.

In the electro-optical device 100, the m rows of scanning lines 12 are scanned row by row in an order of first, second, third, . . . , m-th row in a period of a frame (V). In detail, as illustrated in the drawing, the scanning signals Gwr(1), Gwr(2), . . . , Gwr(i−1), Gwr(i), . . . , Gwr(m−1), and Gwr(m) are sequentially and exclusively set to an H level by the scanning line driving circuit 130 for each horizontal scanning period (H).

Note that, in the preset embodiment, periods in which the adjacent scanning signals among the scanning signals Gwr (1) to Gwr(m) are at the H level are separated in time. Specifically, after the scanning signal Gwr(i−1) changes from an L level to the H level, the next scanning signal Gwr(i) is at the H level after a period. This period corresponds to a horizontal blanking period.

In the present description, the period of the one frame (V) refers to a period required to display one frame of the image designated by the video data supplied from the upper circuit. When a length of the period of the one frame (V) is the same as a vertical synchronization period, for example, when a frequency of the vertical synchronization signal included in the synchronization signal Sync is 60 Hz, the length is 16.7 milliseconds corresponding to one cycle of the vertical synchronization signal. Further, the horizontal scanning period (H) is a time interval at which the scanning signals Gwr(1) to Gwr(m) are sequentially at the H level, but for convenience in the drawing, a start timing of the horizontal scanning period (H) is approximately at a center of the horizontal blanking period.

When a certain scanning signal among the scanning signals Gwr(1) to Gwr(m), for example, the scanning signal Gwr(i) in the i-th row is at the H level, the transistor 121 of the pixel circuit 110 located in the i-th row is in an on state. Thus, in the pixel circuit 110, one end of the liquid crystal element 120 and the one end of the storage capacitor 109 are in a state of electrically coupled to the corresponding data line 14. In a case of the pixel circuit 110 in the i-th row and the (3j−2)-th column, the one end of the liquid crystal element 120 and the one end of the storage capacitor 109 in the pixel circuit 110 is in a state of electrically coupled to the data line 14 in the (3j−2)-th column.

Note that, in the present description, an "ON state" of the transistor means that the source node and drain node of the transistor are electrically closed and enters a low impedance state. Moreover, an "off state" of the transistor means that the source node and drain node are electrically open and enters a high impedance state.

During the period in which the scanning signal Gwr(i) is at the H level, the selection signals Sel(1), Sel(2), and Sel(3) are sequentially and exclusively at the H level.

When the selection signal Sel(1) is at the H level, the inversion selection signal/Sel(1) is at the L level, an output of the NOT circuit Iv1 in the first series is at the H level. Thus, the transistor N1 in the first series is in an on state.

The display control circuit 30 sequentially outputs the potentials of the data signals Vid(1), Vid(2), Vid(2), . . . , Vid(j), . . . , Vid(n) at potentials corresponding to gradation of the pixels in the i-th row and the first, fourth, . . . , (3j−2)-th, . . . , and (3n-2)-th columns and also potentials according to the write polarity.

Thus, the data signal Vid(j) is applied to the one end of the liquid crystal element 120 and the one end of the storage capacitor 109 in the pixel circuit 110 in the i-th row and the (3j−2)-th column via the data line 14 in the (3j−2)-th column. Even when the transistor N1 in the (3j−2) column is at an off state, moreover, even when the horizontal scanning period for the i-th row is terminated and the scanning signal Gwr(i) is at the L level, the potential of the data signal Vid(j) applied to the one end of the liquid crystal element 120 is maintained by the capacitive property of the liquid crystal element 120 and the storage capacitor 109.

As is well known, in the liquid crystal element 120, the orientation of liquid crystal molecules changes according to an electric field generated by the pixel electrode 118 and the common electrode 108. Therefore, the liquid crystal element 120 has a transmittance according to an effective value of an applied voltage.

Note that, in the embodiment, it is assumed that the normally black mode is employed in which the transmittance is lowest when the voltage applied to the liquid crystal element 120 is zero and the transmittance is higher as the voltage applied to the liquid crystal element 120 is increased.

The data signal Vid (j) is a potential according to gradation of the pixel in the i-th row and the (3j−2)-th column, and is a potential according to the write polarity. When the liquid crystal element 120 is driven, it is required to perform AC driving so as to prevent degradation of the liquid crystal 105. Thus, a high-level positive potential and a low-level negative potential with respect to a potential Vcen at the center of the amplitude is applied to the pixel electrode 118 in an alternating switching manner for each period corresponding to one frame (V), for example. Note that the potential Vcen may be regarded as substantially the same potential as a potential LCcom applied to the common electrode 108.

A range within which the positive potential may fall is indicated with Rng(+). For example, the range Rng(+) is from a potential Vwt(+) when the gradation is at the highest value to a potential Vbk(+) when the gradation is at the lowest value. A range within which the negative potential may fall is indicated with Rng(−). For example, the range Rng(−) is from a potential Vwt(−) when the gradation is at the highest value to a potential Vbk(−) when the gradation is at the lowest value. Herein, description is made on the (3j−2) column in the horizontal scanning in the i-th row. A similar operation is executed similarly in the first, fourth, seventh, . . . , and (3n-2)-th columns in the first series.

The selection signal Sel(1) is at the L level, and then the selection signal Sel(2) is at the H level.

When the selection signal Sel(2) is at the H level, the transistor N1 in the second series is in an on state. The display control circuit 30 sequentially outputs the potentials of the data signals Vid(1), Vid(2), Vid(2), . . . , Vid(j), . . . . Vid(n) at potentials corresponding to gradation of the pixels in the i-th row and the second, fifth, . . . , (3j−1)-th, . . . , and (3n−1)-th columns and also potentials according to the write polarity. With this, the liquid crystal element 120 of the pixel circuit 110 corresponding to the intersection between the scanning line in the i-th row and the data line 14 in the second series achieves the transmittance according to gradation.

The selection signal Sel(2) is at the L level, and then the selection signal Sel(3) is at the H level.

When the selection signal Sel(3) is at the H level, the transistor N1 in the third series is in an on state. The display control circuit 30 sequentially outputs the potentials of the data signals Vid(1), Vid(2), Vid(2), . . . , Vid(j), . . . . Vid(n) at potentials corresponding to gradation of the pixels in the i-th row and the third, sixth, . . . , (3j)-th, . . . , and (3n)-th columns and also potentials according to the write polarity. With this, the liquid crystal element 120 of the pixel circuit 110 corresponding to the intersection between the scanning line in the i-th row and the data line 14 in the third series achieves the transmittance according to gradation. After that, the selection signal Sel(3) is at the L level, and the horizontal scanning of the i-th row is terminated.

Herein, description is made on the horizontal scanning in the i-th row. A similar operation is sequentially executed in the horizontal scanning in the first, second, third, . . . , and the m-th rows.

When the horizontal scanning in the m-th row is terminated, the processing proceeds to the subsequent frame period, and the horizontal scanning is started again from the first row. Note that, during the next frame period, the display control circuit 30 inverts the potential polarity of the data signal.

Before describing the advantages of the electro-optical device 100 according to the first embodiment, an electro-optical device according to a comparative example is described.

Figure 7:
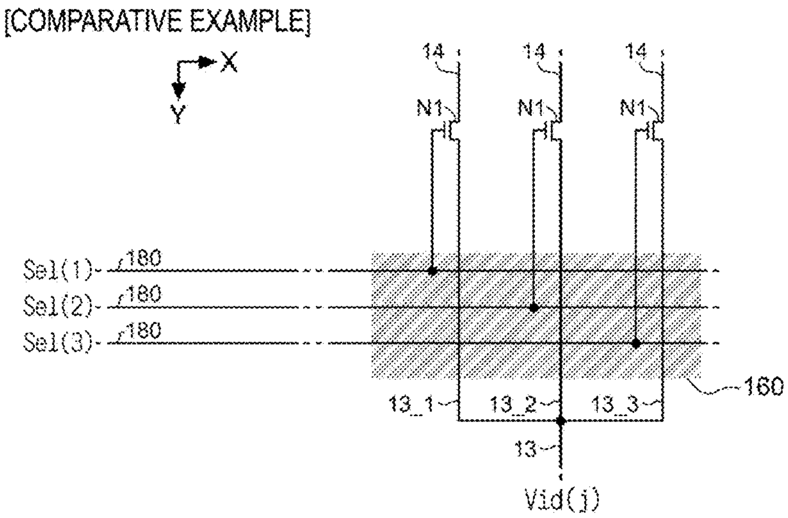
FIG. 7 is a diagram illustrating a configuration of a demultiplexer of an electro-optical device according to a comparative example.

FIG. 7 is a diagram illustrating a configuration in the j-th group in the peripheral circuit 150 in the electro-optical device according to the comparative example. As illustrated in the drawing, in the comparative example, the selection signals Sel(1) to Sel(3) are supplied respectively via the selection signal lines 180, but the inversion selection signals/Sel(1) to/Sel(3) are not supplied. Further, the NOT circuit Iv1 for each of the data lines 14 is not provided. In the comparative example, in plan view, the light shielding film 160 overlaps with the three selection signal lines 180 to which the selection signals Sel(1) to Sel(3) are supplied respectively, as indicated with hatching. Note that, in reality, the light shielding film 160 also overlaps with the transistor N1. However, to avoid obscuring the symbols and making the drawing difficult to understand, hatching is not applied over the transistor N1.

The light shielding film 160 and the selection signal line 180 are electrically insulated from each other via an insulating layer, but a parasitic capacitance is generated due to the insulating layer as a dielectric.

Figure 8:
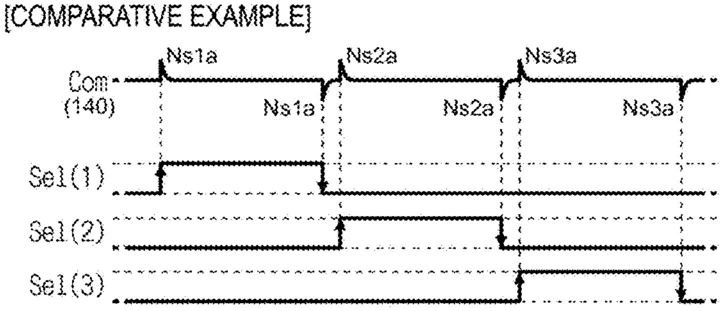
FIG. 8 is a diagram for describing issues in the comparative example.

FIG. 8 is a diagram for describing noise superimposed onto the light shielding film 160 in the comparative example. The selection signals Sel(1), Sel(2), and Sel(3) are exclusively at the H level in the stated order in the horizontal scanning period (H).

When the logic level of the selection signal Sel(1) changes, noise Nsla according to the change of the logic level is superimposed onto the light shielding film 160 via parasitic capacitance. Similarly, when the logic levels of the selection signals Sel(2) and Sel(3) change, noise according to the changes of the logic levels are superimposed onto the light shielding film 160 via parasitic capacitance.

In detail, noise Ns2*a* according to the change of the logic level of the selection signal Sel(2) is superimposed onto the light shielding film 160 via parasitic capacitance, and noise Ns3*a* according to the change of the logic level of the selection signal Sel(3) is superimposed onto the light shielding film 160 via parasitic capacitance.

The light shielding film 160 is electrically coupled to the capacitance wiring line 140 maintained at the potential Com. However, when noise is superimposed onto the light shielding film 160, the light shielding film 160 fluctuates from the potential Com, which causes an unstable state. The fluctuation of the potentials of the light shielding film 160 and the capacitance wiring line 140 causes degradation of display quality such as display unevenness.

Figure 9:
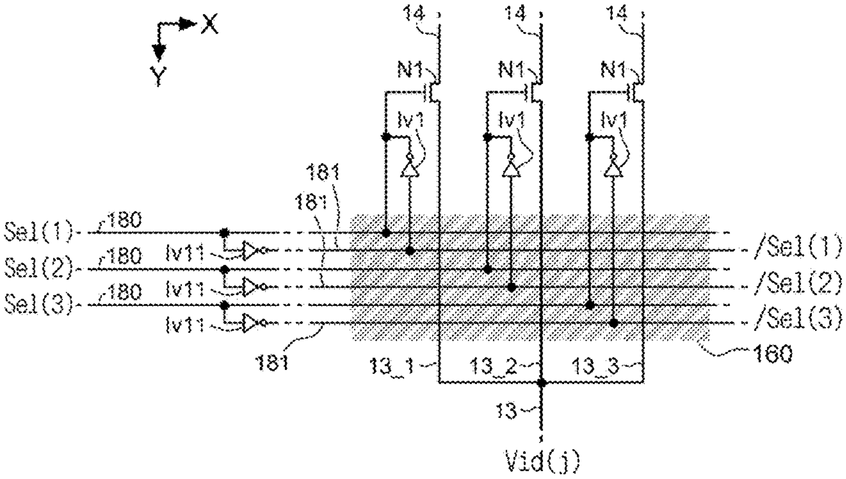
FIG. 9 is a perspective view illustrating a configuration of a demultiplexer and the like of the electro-optical device according to the first embodiment.

FIG. 9 is a diagram illustrating a configuration in the j-th group in the peripheral circuit 150 in the electro-optical device 100 according to the first embodiment.

As described above, in the embodiment, the selection signals Sel(1) to Sel(3) are individually supplied via the selection signal lines 180. Moreover, the inversion selection signals/Sel(1) to/Sel(3) are also individually supplied via the inversion selection signal lines 181.

Further, in the first embodiment, the light shielding film 160 overlaps not only with the three selection signal lines 180 but also with the three inversion selection signal lines 181 in plan view. The light shielding film 160 and the inversion selection signal line 181 are electrically insulated from each other via an insulating layer. However, similarly to the selection signal line 180, a parasitic capacitance is generated due to the insulating layer as a dielectric.

The inversion selection signals/Sel(1) to/Sel(3) are signals obtained by inverting the logical levels of the selection signals Sel(1) to Sel(3). Thus, the change of the logic level of the selection signal Sel(1) and the change of the logic level of the inversion selection signal/Sel(1) are in opposite directions, and have approximately the same magnitude. Similarly, the change of the logic level of the selection signal Sel(2) and the change of the logic level of the inversion selection signal/Sel(2) are also in opposite directions, and have approximately the same magnitude, and the change of the logic level of the selection signal Sel(3) and the change of the logic level of the inversion selection signal/Sel(3) are also in opposite directions, and have approximately the same magnitude.

Figure 10:
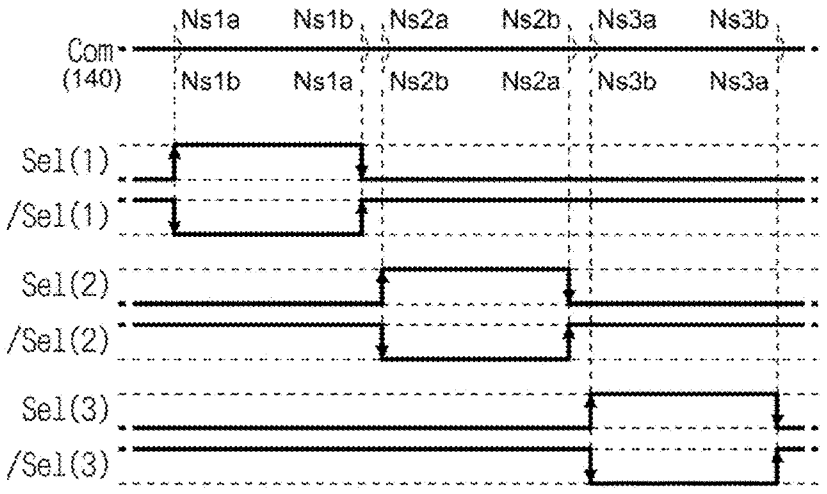
FIG. 10 is a diagram for describing noise cancellation in the first embodiment.

FIG. 10 is a diagram for describing cancellation of noise superimposed onto the light shielding film 160 in the first embodiment.

When the logic level of the selection signal Sel(1) changes, the noise Ns1a according to the change of the logic level is superimposed onto the light shielding film 160 via parasitic capacitance. However, at the same time, noise Ns1b that is opposite to the noise Ns1a and has substantially the same magnitude, specifically, noise Ns1b according to the change of the logic level of the inversion selection signal/Sel(1) is superimposed onto the light shielding film 160 via parasitic capacitance.

Therefore, the noise Ns1a that is superimposed onto the light shielding film 160 as the logic level of the selection signal Sel(1) changes is canceled out by the noise Ns1b that is superimposed as the logic level of the inversion selection signal/Sel(1) changes.

Similarly, the noise Ns2a that is superimposed onto the light shielding film 160 as the logic level of the selection signal Sel(2) changes is canceled out by noise Ns2b that is superimposed as the logic level of the inversion selection signal/Sel(2) changes.

The noise Ns3a that is superimposed onto the light shielding film 160 as the logic level of the selection signal Sel(3) changes is canceled out by noise Ns3b that is superimposed as the logic level of the inversion selection signal/Sel(3) changes.

Here, the phrase that certain "noise" is canceled by different "noise" refers to a situation where opposing noise propagates through, for example, parasitic capacitance and reduces the original noise by offsetting the original noise.

In this manner, in the first embodiment, the noise Ns1a to the noise Ns3a caused by the changes of the logic levels of the selection signals Sel(1) to Sel(3) are canceled out by the noise Ns1b to the noise Ns3b caused by the changes of the logic levels of the inversion selection signals/Sel(1) to/Sel (3). Therefore, in the first embodiment, fluctuation of the potential of the light shielding film 160 is suppressed. Thus, degradation of display quality such as display unevenness caused by the potential fluctuation of the capacitance wiring line 140 coupled to the light shielding film 160 can be avoided.

Note that, in the first embodiment, parasitic capacitance generated between the light shielding film 160 and the selection signal line 180 may include the same or a similar configuration as parasitic capacitance generated between the light shielding film 160 and the inversion selection signal line 181. To achieve this, it is conceivable that the wiring layer forming the light shielding film 160, the wiring layer forming the selection signal line 180, and the wiring layer forming the inversion selection signal line 181 be configured as follows.

Figure 11:
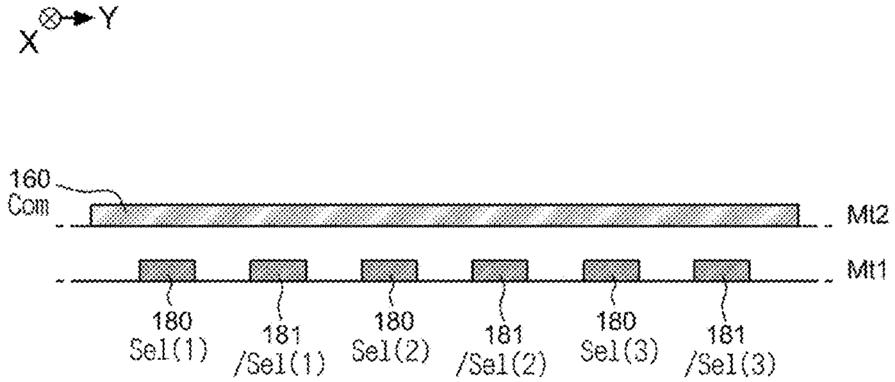
FIG. 11 is a diagram illustrating a wiring layer in the first embodiment.

For example, as illustrated in the cross-sectional view in FIG. 11, there may be adopted a configuration in which a first wiring layer Mt1 is subjected to patterning to form the selection signal line 180 and the inversion selection signal line 181 and a second wiring layer Mt2 is subjected to patterning to form the light shielding film 160.

Note that, in reality, a gate electrode, a semiconductor layer, and the like are provided beneath the first wiring layer Mt1 whereas the wiring layers such as the pixel electrode 118 are provided above the second wiring layer Mt2. Further, an inter-layer insulating film is provided between the wiring layers.

With this configuration, the commonly shared insulating film is sandwiched between the selection signal line 180 or the inversion selection signal line 181, and the light shielding film 160. Thus, parasitic capacitance between the selection signal line 180 and the light shielding film 160 and parasitic capacitance between the inversion selection signal line 181 and the light shielding film 160 can easily match with each other.

Note that there may be adopted a configuration in which the first wiring layer Mt1 is subjected to patterning to form the light shielding film 160, and the second wiring layer Mt2 is subjected to patterning to form the selection signal line 180 and the inversion selection signal line 181.

Figure 12:
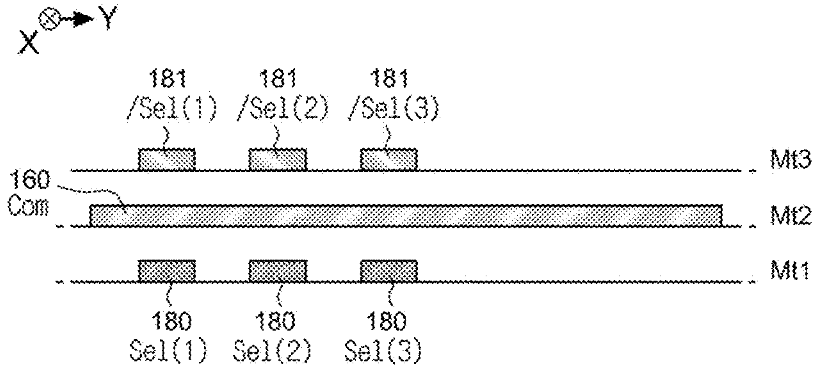
FIG. 12 is a diagram illustrating another example of the wiring layer in the first embodiment.

Further, for example, as illustrated in the cross-sectional view in FIG. 12, there may be adopted a configuration in which the first wiring layer Mt1 is subjected to patterning to form the selection signal line 180, the second wiring layer Mt2 is subjected to patterning to form the light shielding film 160, and a third wiring layer Mt3 is subjected to patterning to form the inversion selection signal line 181. In other words, there may be adopted a configuration in which the light shielding film 160 is sandwiched between the selection signal line 180 and the inversion selection signal line 181.

With this configuration, the selection signal line 180 and the inversion selection signal line 181 overlap with each other in plan view. Thus, the region in plan view can be reduced.

Note that there may be adopted a configuration in which the first wiring layer Mt1 is subjected to patterning to form the inversion selection signal line 181, and the third wiring layer Mt3 is subjected to patterning to form the selection signal line 180.

In the first embodiment, the switching element that distributes the data signal, which is supplied to the data signal line 13, to each of the data lines 14, is configured by the N-channel transistor N1. Alternatively, a P-channel transistor may be used.

However, when only one of the channel types is used as the transistor, a resistance value in an on state is relatively increased. Thus, as resolution is increased, and the period during which the transistor is in an ON state is reduced, there is a possibility that the data signal supplied to the data signal line 13 cannot be sufficiently written (propagate) to each of the data lines 14.

Therefore, a second embodiment that reduces such a possibility is described. Note that the electro-optical device 100 according to the second embodiment is different from the first embodiment only in the demultiplexer and the periphery thereof, and the other matters are the same as those in the first embodiment. Thus, the second embodiment is described while mainly focusing on the differences.

Figure 13:
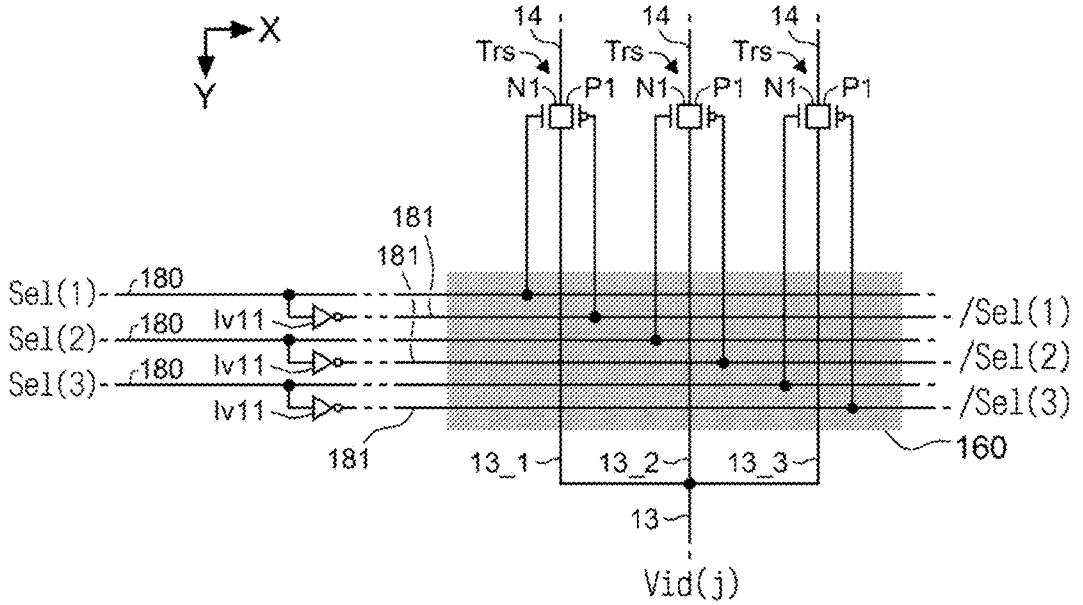
FIG. 13 is a perspective view illustrating a configuration of a demultiplexer and the like of an electro-optical device according to a second embodiment.

FIG. 13 is a diagram illustrating a configuration in the j-th group in the peripheral circuit 150 in the electro-optical device 100 according to the second embodiment.

In the second embodiment, a transmission gate Trs is provided for each of the data lines 14.

The transmission gate Trs is an analog switch in which a P-channel transistor P1 and the N-channel transistor N1 are coupled in series. Both the transistors P1 and N1 are thin film transistors similar to the transistor 116 in the pixel circuit 110.

Further, in the second embodiment, the NOT circuit Iv1 is not provided for each of the data lines 14.

In the second embodiment, similarly to the first embodiment, the three inversion selection signal lines 181 extend in the X direction similarly to the selection signal lines 180. The inversion selection signals/Sel(1) to/Sel(3) are sequentially supplied to the three inversion selection signal lines 181 by the respective NOT circuits Iv11 provided corresponding thereto.

In the j-th group, the transmission gate Trs in the first series includes an input end coupled to the data signal line 13_1 that is split corresponding to the first series in the j-th group, and an output end coupled to the data line 14 in the first series in the j-th group.

In the j-th group, the selection signal Sel(1) is supplied to the gate node of the transistor N1 of the transistors P1 and N1 forming the transmission gate Trs in the first series. The inversion selection signal/Sel(1) is supplied to the gate node of the transistor P1 forming the transmission gate Trs.

In the j-th group, the transmission gate Trs in the second series is similar to that in the first series.

In other words, in the j-th group, the transmission gate Trs in the second series includes an input end coupled to the data signal line 13_2 that is split corresponding to the second series in the j-th group, and an output end coupled to the data line 14 in the second series in the j-th group. In the j-th group, the selection signal Sel(2) is supplied to the gate node of the transistor N1 forming the transmission gate Trs in the second series, and the inversion selection signal/Sel(2) is supplied to the gate node of the transistor P1.

In the j-th group, the transmission gate Trs in the third series is similar to that in the first series.

In other words, in the j-th group, the transmission gate Trs in the third series includes an input end coupled to the data signal line 13_3 that is split corresponding to the third series in the j-th group, and an output end coupled to the data line 14 in the third series in the j-th group. In the j-th group, the selection signal Sel(3) is supplied to the gate node of the transistor N1 forming the transmission gate Trs in the third series, and the inversion selection signal/Sel(3) is supplied to the gate node of the transistor P1.

In the second embodiment, the noise Ns1*a* to the noise Ns3*a* caused by the changes of the logic levels of the selection signals Sel(1) to Sel(3) are also canceled out by the noise Ns1*b* to the noise Ns3*b* caused by the changes of the logic levels of the inversion selection signals/Sel(1) to/Sel (3). Therefore, in the second embodiment, fluctuation of the potential of the light shielding film 160 is suppressed. Thus, degradation of display quality such as display unevenness caused by the potential fluctuation of the capacitance wiring line 140 coupled to the light shielding film 160 can also be avoided.

In the second embodiment, an on state of the transmission gate Trs refers to a situation where the transistor N1 and the transistor P1 are simultaneously in an on state in parallel. Thus, the resistance value is reduced to approximately a half of that when only one type of channel transistor is in an on state.

Further, when the potential of the data signal is high in positive-polarity writing, the P-channel transistor compensates for the insufficient writing due to the N-channel transistor. In contrast, when the potential of the data signal is low in negative-polarity writing, the N-channel transistor compensates for the insufficient writing due to the P-channel transistor.

Therefore, according to the second embodiment, even when resolution is increased, the data signal supplied to the data signal line 13 can be sufficiently written to each of the data lines 14, and display unevenness due to the difference in the write polarity can be suppressed.

Next, description is made on an example of a split wiring line from the selection signal line 180 and the inversion selection signal line 181 to the gate node of the transistor P1 and the gate node of the transistor N1 that form the transmission gate Trs in the second embodiment.

Figure 14:
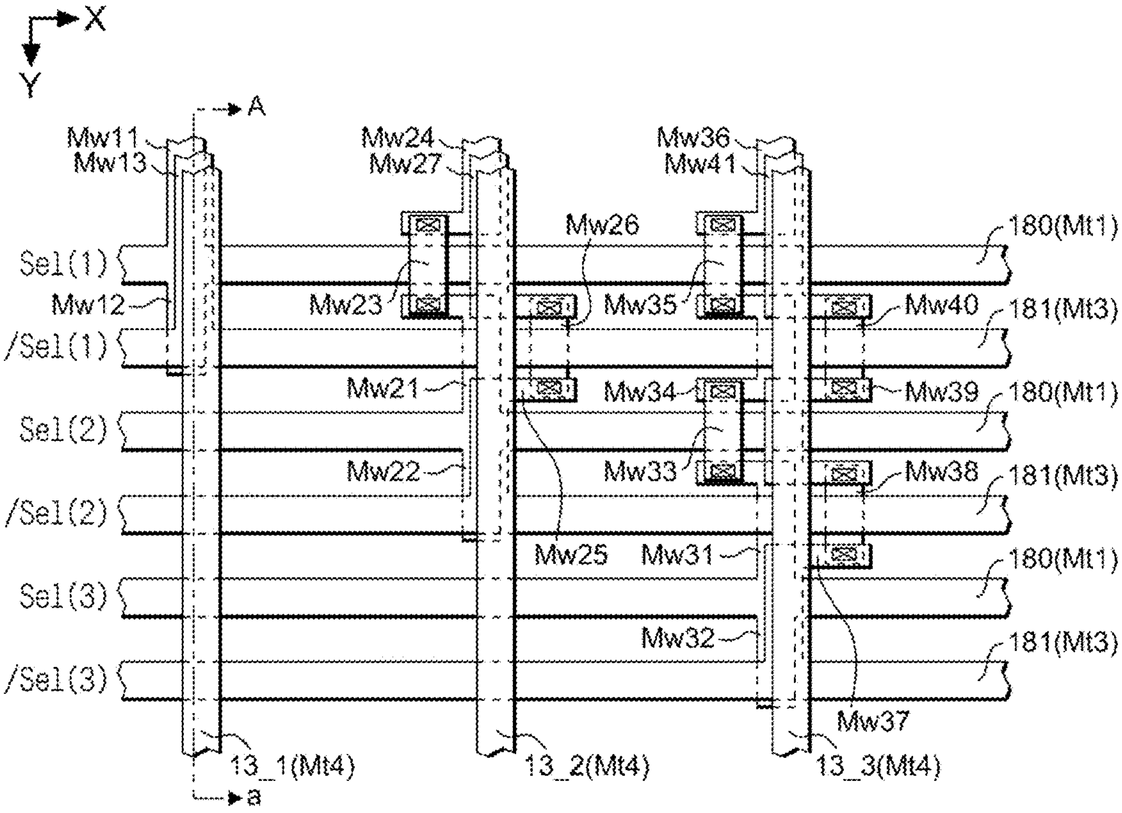
FIG. 14 is a plan view illustrating main parts of the electro-optical device according to the second embodiment.

FIG. 14 is a plan view illustrating main parts of the electro-optical device 100 according to the second embodiment. Specifically, the main parts include the selection signal line 180 and the inversion selection signal line 181, and the split wiring line toward the gate node of the transistor forming the transmission gate Trs. Note that, in FIG. 14, the respective wiring lines are shifted from each other for better understanding of the layer structure. In reality, the respective wiring lines overlap with each other in plan view. Further, FIG. 15 is a cross-sectional view taken along the line A-a in FIG. 14, illustrating a configuration of the wiring layer in a simplified manner.

Figure 15:
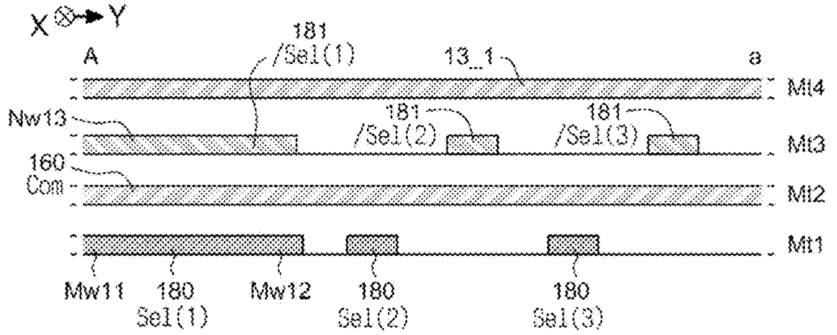
FIG. 15 is a diagram illustrating a wiring layer of the electro-optical device according to the second embodiment.

In the second embodiment, as illustrated in the cross-sectional view in FIG. 15, the first wiring layer Mt1 is subjected to patterning to form the selection signal line 180 and the like, the second wiring layer Mt2 is subjected to patterning to form the light shielding film 160, the third wiring layer Mt3 is subjected to patterning to form the inversion selection signal line 181 and the like, and a fourth wiring layer Mt4 is subjected to patterning to form the data signal line 13_1 and the like. Note that, in FIG. 14, the light shielding film 160 is omitted to avoid complexity.

As illustrated in FIG. 14, both the selection signal lines 180 and the inversion selection signal lines 181 extend in the X direction, and are arrayed in the following order, for example. In detail, in the order toward the Y direction, the selection signal line 180 to which the selection signal Sel(1) is supplied, the inversion selection signal line 181 to which the inversion selection signal/Sel(1) is supplied, the selection signal line 180 to which the selection signal Sel(2) is supplied, the inversion selection signal line 181 to which the inversion selection signal/Sel(2) is supplied, the selection signal line 180 to which the selection signal Sel(3) is supplied, and the inversion selection signal line 181 to which the inversion selection signal/Sel(3) is supplied are arrayed.

In the first series, wiring lines Mw11 and Mw12 are split from a point at which the selection signal line 180 to which the selection signal Sel(1) is supplied and the data signal line 13_1 intersect with each other in plan view. In detail, the wiring line Mw11 is split in a direction opposite to the Y direction from the selection signal line 180 to which the selection signal Sel(1) is supplied, and extends to reach the gate node of the transistor N1 forming the transmission gate Trs in the first series, which is omitted in FIG. 14. Further, the wiring line Mw12 extends in the Y direction to reach an intersection with the inversion selection signal line 181 to which the inversion selection signal/Sel(1) is supplied, in plan view.

In plan view, the wiring line Mw13 is split from a point at which the inversion selection signal line 181 to which the inversion selection signal/Sel(1) is supplied and the data signal line 13_1 intersect with each other. In detail, the wiring line Mw13 is split in a direction opposite to the Y direction from the inversion selection signal line 181 to which the inversion selection signal/Sel(1) is supplied, and extends to reach the gate node of the transistor P1 forming the transmission gate Trs in the first series, which is omitted in FIG. 14.

Therefore, in the first series, the light shielding film 160 formed of the second wiring layer Mt2 is interposed between the wiring lines Mw11 and Mw12 of the first wiring layer Mt1 and the wiring line Mw13 of the third wiring layer Mt3 for substantially the same distance in the Y direction.

In the second series, wiring lines Mw21 and Mw22 are split from a point at which the selection signal line 180 to which the selection signal Sel(2) is supplied and the data signal line 13_2 intersect with each other in plan view. In detail, the wiring line Mw21 is split in a direction opposite to the Y direction from the selection signal line 180 to which the selection signal Sel(2) is supplied, passes through the inversion selection signal line 181 to which the inversion selection signal/Sel(1) is supplied, and is bent in a direction opposite to the X direction right before the selection signal line 180 to which the selection signal Sel(1) is supplied. The wiring line Mw21 and the selection signal line 180 are obtained by subjecting the same first wiring layer Mt1 to patterning, and hence cannot intersect with each other in plan view. Thus, the wiring line Mw21 crosses over the selection signal line 180 to which the selection signal Sel(1) is supplied, and is coupled to a wiring line Mw24 via a relay wiring line Mw23. Note that the wiring line Mw23 is obtained by, for example, subjecting the third wiring layer Mt3 other than the first wiring layer Mt1 and the second wiring layer Mt2 to patterning, and is coupled to the wiring lines Mw21 and Mw24 via contact holes indicated with x marks in the drawing.

In this manner, the selection signal line 180 to which the selection signal Sel(2) is supplied is coupled to the wiring line Mw24 via the wiring lines Mw21 and Mw23 sequentially. The wiring line Mw24 is in a state of overlapping with the data signal line 13_2 in plan view, and extends in a direction opposite to the Y direction to reach the gate node of the transistor N1 forming the transmission gate Trs in the second series, which is omitted in FIG. 14.

Further, the wiring line Mw22 extends in the Y direction to reach an intersection with the inversion selection signal line 181 to which the inversion selection signal/Sel(2) is supplied in plan view.

A wiring line Mw25 is split from a point at which the inversion selection signal line 181 to which the inversion selection signal/Sel(2) is supplied and the data signal line 13_2 intersect with each other in plan view. In detail, the wiring line Mw25 is split in a direction opposite to the Y direction from the inversion selection signal line 181 to which the inversion selection signal/Sel(2) is supplied, crosses over the selection signal line 180 to which the selection signal Sel(1) is supplied and the wiring line Mw22, and is bent right before the inversion selection signal line 181 to which the inversion selection signal/Sel(1) is supplied.

The wiring line Mw25 and the inversion selection signal line 181 are obtained by subjecting the same third wiring layer Mt3 to patterning, and hence cannot intersect with each other in plan view. Thus, the wiring line Mw25 passes through the inversion selection signal line 181 to which the inversion selection signal/Sel(1) is supplied, and is coupled to the wiring line Mw27 via a relay wiring line Mw26. Note that the wiring line Mw26 is obtained by, for example, subjecting the first wiring layer Mt1 other than the second wiring layer Mt2 and the third wiring layer Mt3 to patterning, and is coupled to the wiring lines Mw25 and Mw27 via contact holes indicated with x marks in the drawing.

In this manner, the inversion selection signal line 181 to which the inversion selection signal/Sel(2) is supplied is coupled to the wiring line Mw27 via the wiring lines Mw25 and Mw26 subsequently. The wiring line Mw27 is in a state of overlapping with the data signal line 13_2 in plan view, and extends in a direction opposite to the Y direction to reach the gate node of the transistor P1 forming the transmission gate Trs in the second series, which is omitted in FIG. 14.

Therefore, in the second series, the light shielding film 160 formed of the second wiring layer Mt2 is interposed between the wiring lines Mw21, Mw22, and Mw24 of the first wiring layer Mt1 and the wiring lines Mw25 and Mw27 of the third wiring layer Mt3 for substantially the same distance in the Y direction.

Note that the light shielding film 160 formed of the second wiring layer Mt2 is obtained through patterning so that the light shielding film 160 does not contact with metal or the like filling the contact holes.

Details of the third series are omitted in the description since they overlap with those of the second series. The selection signal line 180 to which the selection signal Sel(3) is coupled to a wiring line Mw36 via wiring lines Mw31, Mw33, Mw34, and Mw35 sequentially. The wiring line Mw36 is in a state of overlapping with the data signal line 13_3 in plan view, and extends in a direction opposite to the Y direction to reach the gate node of the transistor N1 forming the transmission gate Trs in the third series, which is omitted in FIG. 14.

Further, the wiring line Mw32 extends in the Y direction to reach an intersection with the inversion selection signal line 181 to which the inversion selection signal/Sel(3) is supplied, in plan view.

The selection signal line 180 to which the inversion selection signal/Sel(3) is supplied is coupled to a wiring line Mw41 via wiring lines Mw37, Mw38, Mw39, and Mw40 sequentially. The wiring line Mw41 is in a state of overlapping with the data signal line 13_3 in plan view, and extends in a direction opposite to the Y direction to reach the gate node of the transistor P1 forming the transmission gate Trs in the third series, which is omitted in FIG. 14.

Therefore, in the third series, the light shielding film 160 formed of the second wiring layer Mt2 is interposed between the wiring lines Mw31, Mw32, Mw34, and Mw36 of the first wiring layer Mt1 and the wiring lines Mw37, Mw39, and Mw41 of the third wiring layer Mt3 for substantially the same distance in the Y direction.

In this manner, in the second embodiment, the light shielding film 160 is sandwiched between the selection signal line 180 and the inversion selection signal line 181 in each series. Moreover, the light shielding film 160 is sandwiched between the wiring line split from the selection signal line 180 and the wiring line split from the inversion selection signal line 181 for substantially the same distance. Thus, in the second embodiment, an effect is exerted by using the transmission gate Trs, and the noise generated in the light shielding film 160 due to the level changes of the selection signals Sel(1) to Sel(3) can be canceled out accurately by the noise due to the level changes of the inversion selection signals/Sel(1) to/Sel(3).

In the second embodiment, the structures of the selection signal line 180 and the inversion selection signal line 181, and the split wiring line from those signal lines toward the gate node of the transistor P1 and the gate node of the transistor N1 that form the transmission gate Trs are not limited to those illustrated in FIG. 14 and FIG. 15.

Figure 16:
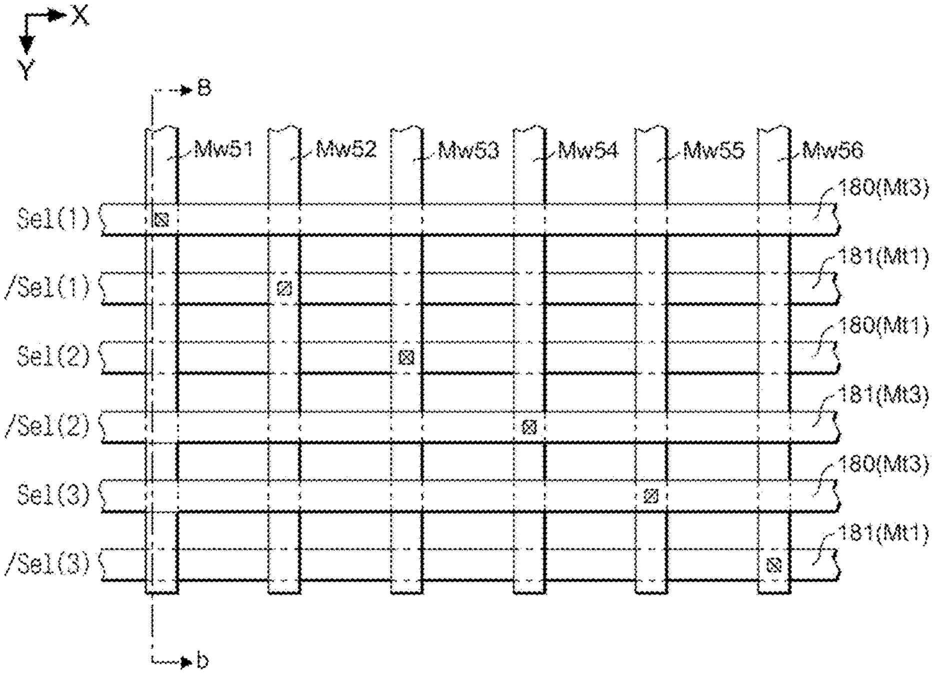
FIG. 16 is a plan view illustrating another example of the main parts of the electro-optical device according to the second embodiment.
Figure 17:
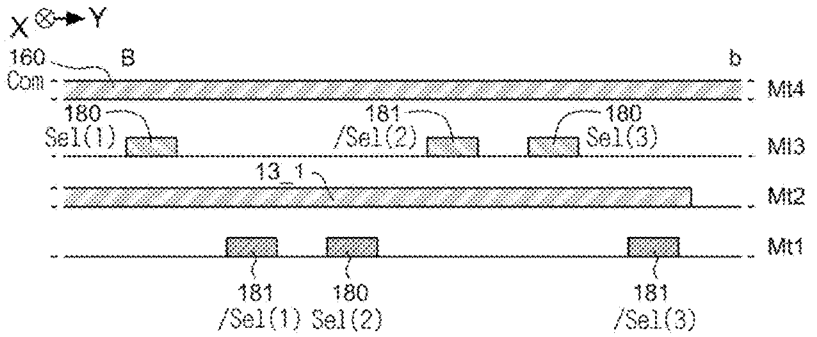
FIG. 17 is a diagram illustrating another example of the wiring layer of the electro-optical device according to the second embodiment.

FIG. 16 is a plan view illustrating another example of the main parts in the electro-optical device 100 according to the second embodiment. FIG. 17 is a cross-sectional view taken along the line B-b in FIG. 16, illustrating a configuration of the wiring layer in a simplified manner.

In this embodiment, for example, the first wiring layer Mt1 is subjected to patterning to form the inversion selection signal lines 181 in the odd-numbered series and the selection signal lines 180 in the even-numbered series, the second wiring layer Mt2 is subjected to patterning to form wiring lines Mw51 to Mw56, the third wiring layer Mt3 is subjected to patterning to form the selection signal lines 180 in the odd-numbered series and the inversion selection signal lines 181 in the even-numbered series, and the fourth wiring layer Mt4 is subjected to patterning to form the light shielding film 160.

Note that, in FIG. 16, the light shielding film 160 and the data signal lines 13_1 to 13_3 are omitted to avoid complexity.

As illustrated in FIG. 16, the selection signal lines 180 and the inversion selection signal lines 181 are arrayed in the order similar to that in FIG. 14.

In contrast, the wiring lines Mw51 to Mw56 extend in the Y direction, and are arrayed at a substantially equal interval. Among those, the wiring line Mw51 is coupled to the selection signal line 180 to which the selection signal Sel(1) is supplied, via a contact hole. Further, on the side in the Y direction, the wiring line Mw51 extends to reach the intersection with the inversion selection signal line 181 to which the inversion selection signal/Sel(3) is supplied. On the side opposite to the Y direction, the wiring line Mw51 extends to reach the intersection with the gate node of the transistor N1 forming the transmission gate Trs in the first series, which is omitted in FIG. 16.

Similarly, the wiring line Mw52 is coupled to the inversion selection signal line 181 to which the inversion selection signal/Sel(1) is supplied, via a contact hole. Further, on the side in the Y direction, the wiring line Mw52 extends to reach the intersection with the inversion selection signal line 181 to which the inversion selection signal/Sel(3) is supplied. On the side opposite to the Y direction, the wiring line Mw52 extends to reach the intersection with the gate node of the transistor P1 forming the transmission gate Trs in the first series, which is omitted in FIG. 16.

The wiring lines Mw53 and Mw54 are respectively coupled to the selection signal line 180 to which the selection signal Sel(2) is supplied and the inversion selection signal line 181 to which the inversion selection signal/Sel(2) is supplied, via contact holes subsequently. On the side in the Y direction, both the wiring lines Mw53 and Mw54 extend to reach the intersection with the inversion selection signal line 181 to which the inversion selection signal/Sel(3) is supplied. On the side opposite to the Y direction, the wiring lines Mw53 and Mw54 extend to sequentially reach the gate nodes of the transistors N1 and P1 forming the transmission gate Trs in the second series.

The wiring lines Mw55 and Mw56 are respectively coupled to the selection signal line 180 to which the selection signal Sel(3) is supplied and the inversion selection signal line 181 to which the inversion selection signal/Sel(3) is supplied, via contact holes subsequently. On the side in the Y direction, both the wiring lines Mw55 and Mw56 extend to reach the intersection with the inversion selection signal line 181 to which the inversion selection signal/Sel(3) is supplied. On the side opposite to the Y direction, the wiring lines Mw55 and Mw56 extend to sequentially reach the gate nodes of the transistors N1 and P1 forming the transmission gate Trs in the third series.

In this manner, according to the other example of the second embodiment, the selection signal line 180 and the inversion selection signal line 181 in each series face each other with the light shielding film 160 therebetween. Thus, the noise generated in the light shielding film 160 due to the level changes of the selection signals Sel(1) to Sel(3) can be canceled out by the noise due to the level changes of the inversion selection signals/Sel(1) to/Sel(3).

Further, the wiring lines Mw51 to Mw56 each have the same area intersecting with the selection signal line 180 and the inversion selection signal line 181, and hence the parasitic capacitance can be equalized.

Figure 18:
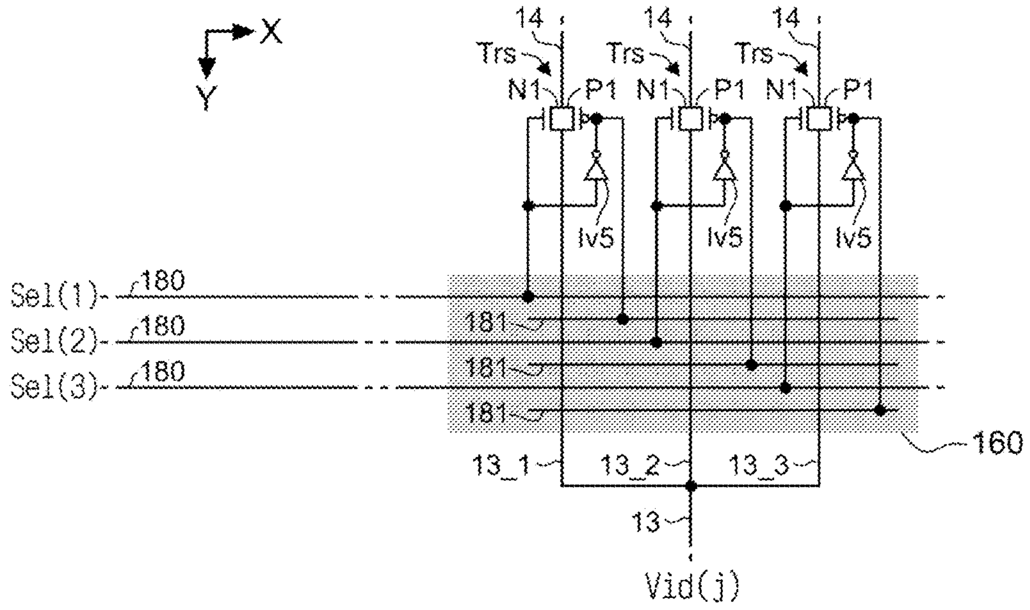
FIG. 18 is a diagram illustrating a configuration of a demultiplexer of an electro-optical device according to a third embodiment.

FIG. 18 is a diagram illustrating a configuration of main parts of the peripheral circuit 150 in the electro-optical device 100 according to a third embodiment.

In the third embodiment, the transmission gate Trs and a NOT circuit Iv5 are provided for each of the data lines 14.

Similarly to the second embodiment, the transmission gate Trs is an analog switch in which a P-channel transistor P1 and the N-channel transistor N1 are coupled in series.

In the j-th group, the transmission gates Trs in the first series, the second series, and the third series include input ends that are sequentially coupled to the data signal lines 13_1, 13_2, and 13_3 corresponding to the series, and output ends that are coupled to the data lines 14 corresponding to the series.

In the j-th group, the selection signal Sel(1) is supplied to the gate node of the transistor N1 forming the transmission gate Trs in the first series, via the wiring line split from the selection signal line 180.

The signal obtained by inverting the logic level of the selection signal Sel(1), which is supplied via the wiring line split from the selection signal line 180, by the NOT circuit Iv5 is supplied to the gate node of the transistor P1 forming the transmission gate Trs in the first series.

In the third embodiment, the three inversion selection signal lines 181 are provided to extend in the X direction similarly to the selection signal lines 180 and to be segmented by group. The signal inverted by the NOT circuit Iv5 in the first series is coupled to one of the three inversion selection signal lines 181 via the signal line extending in the Y direction.

In the j-th group, the transmission gate Trs and the NOT circuit Iv5 in the second series are similar to those in the first series.

In other words, in the j-th group, the selection signal Sel(2) is supplied to the gate node of the transistor N1 forming the transmission gate Trs in the second series, via the wiring line split from the selection signal line 180.

The signal obtained by inverting the logic level of the selection signal Sel(2), which is supplied via the wiring line split from the selection signal line 180, by the NOT circuit Iv5 is supplied to the gate node of the transistor P1 forming the transmission gate Trs in the second series.

The signal inverted by the NOT circuit Iv5 in the second series is coupled to another of the three inversion selection signal lines 181 via the signal line extending in the Y direction.

In the j-th group, the transmission gate Trs in the third series and the NOT circuit Iv5 are also the same as those in the first series and the second series.

In other words, in the j-th group, the selection signal Sel(3) is supplied to the gate node of the transistor N1 forming the transmission gate Trs in the third series, via the wiring line split from the selection signal line 180.

The signal obtained by inverting the logic level of the selection signal Sel(3), which is supplied via the wiring line split from the selection signal line 180, by the NOT circuit Iv5 is supplied to the gate node of the transistor P1 forming the transmission gate Trs in the third series.

The signal inverted by the NOT circuit Iv5 in the third series is coupled to the other of the three inversion selection signal lines 181 via the signal line extending in the Y direction.

The inversion selection signals/Sel(1) to/Sel(3) in the first embodiment are supplied individually to the three inversion selection signal lines 181.

Thus, similarly to the first embodiment and the second embodiment, the light shielding film 160 intersects with the three selection signal lines 180 to which the selection signals Sel(1) to Sel(3) are supplied and the three inversion selection signal lines 181 to which the inversion selection signals/ Sel (1) to/Sel(3) are supplied.

Note that, in the third embodiment, in plan view, there may be adopted such a layout that an area in which the light shielding film 160 and the selection signal line 180 in each series overlap with each other and an area in which the light shielding film 160 and the inversion selection signal line 181 overlap with each other are substantially the same. The reason for this is that parasitic capacitance generated between the light shielding film 160 and the selection signal line 180 and parasitic capacitance generated between the light shielding film 160 and the inversion selection signal line 181 are substantially the same, allowing the noise to be accurately canceled out.

In the third embodiment, the noise caused by the changes of the logic levels of the selection signals Sel(1) to Sel(3) is also canceled out by the noise caused by the changes of the logic levels of the inversion selection signals/Sel(1) to/Sel (3). Therefore, in the third embodiment, degradation of display quality such as display unevenness caused by the potential fluctuation of the light shielding film 160 and the capacitance wiring line 140 can also be avoided.

Note that, in the third embodiment illustrated in FIG. 18, there is adopted a configuration in which the NOT circuit Iv5 inverts the selection signal supplied to the selection signal line 180, and supplies the inverted signal to the gate node of the transistor P1 in the transmission gate Trs and the inversion selection signal line 181. However, the configuration is not limited thereto.

Although not particularly illustrated, there may be adopted a configuration in which the NOT circuit Iv5 inverts the inversion selection signal supplied to the inversion selection signal line 181, and supplied the inverted signal to the gate node of the transistor N1 in the transmission gate Trs and the selection signal line 180.

In the first embodiment, the second embodiment, and the third embodiment (hereinafter, referred to as "the embodiment and the like"), the number of data lines 14 forming one group is "three" in the description. The number may be "two" or an integer equal to or greater than "four".

Next, a projection-type display apparatus is described as an example of an electronic apparatus to which the electro-optical device 100 according to the embodiment and the like is applied.

Figure 19:
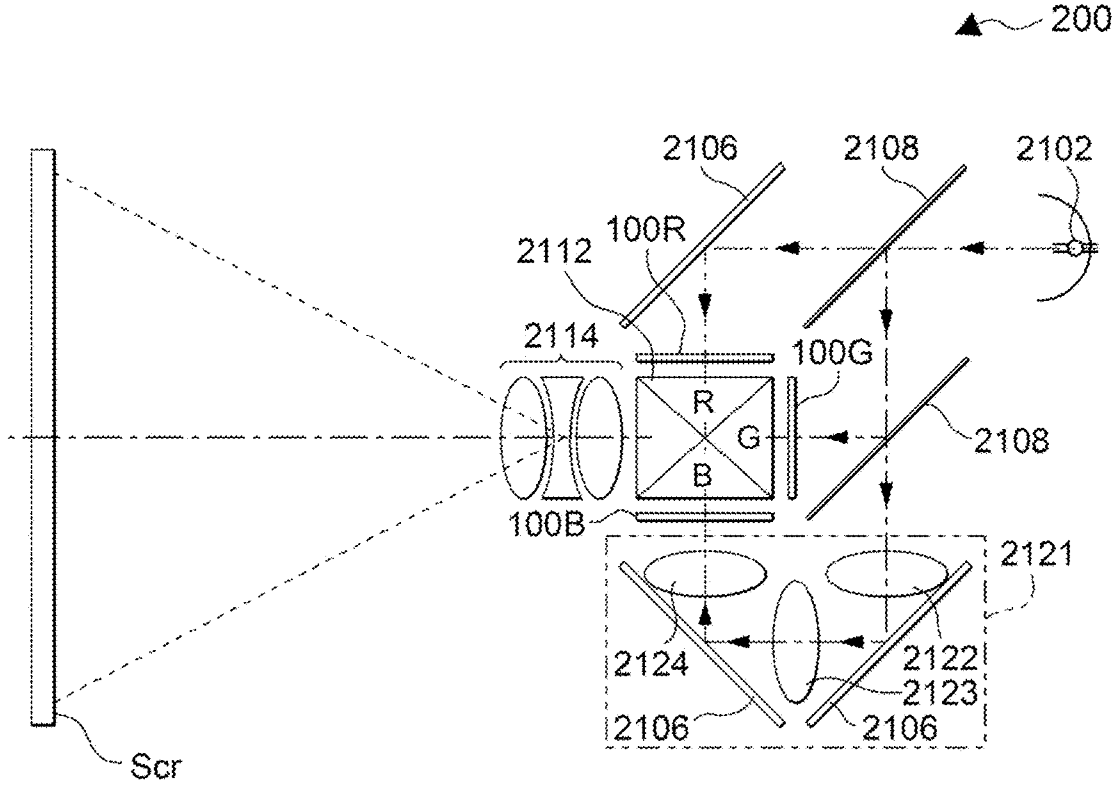
FIG. 19 is a diagram illustrating a projection-type display apparatus to which the electro-optical device according to the embodiment and the like is applied.

FIG. 19 is a diagram illustrating an optical configuration of a projection-type display apparatus 200. As illustrated in the drawing, the projection-type display apparatus 200 includes electro-optical devices 100R, 100G, and 100B.

Inside the projection-type display apparatus 200, a lamp unit 2102 including a white light source such as a halogen lamp and an LED is provided. Light emitted from the lamp unit 2102 is separated into three primary colors of red (R), green (G), and blue (B) by three mirrors 2106 and two dichroic mirrors 2108 disposed inside. Of the light of the primary colors, light of R is incident on the electro-optical device 100R, light of G is incident on the electro-optical device 100G, and light of B is incident on the electro-optical device 100B, respectively.

Note that, since an optical path of B is longer than optical paths of R and G, it is necessary to prevent a loss in the optical path of B. For this reason, a relay lens system 2121 including an incident lens 2122, a relay lens 2123, and an emission lens 2124 is provided in the optical path of B.

The electro-optical devices 100R, 100G, and 100B are of the same type as the electro-optical device 100 according to the embodiment and the like, but they are different in the color of incident light and are distinguished by reference numerals for convenience.

The liquid crystal element of the electro-optical device 100R is driven based on a data signal corresponding to R supplied from the upper circuit, and has a transmittance corresponding to the voltage of the data signal. Thus, in the electro-optical device 100R, a transmitted image of R is generated by controlling the transmittance of the liquid crystal element individually.

Similarly, in the electro-optical device 100G, a transmitted image of G is generated based on a data signal corresponding to G. In the electro-optical device 100B, a transmitted image of B is generated based on a data signal corresponding to B.

The transmitted images of the respective colors generated by the electro-optical devices 100R, 100G, and 100B are incident on a dichroic prism 2112 from three directions. In the dichroic prism 2112, the R light and the B light are refracted at 90 degrees, while the G light travels straight. The dichroic prism 2112 therefore combines the images of the respective colors. The image combined by the dichroic prism 2112 is incident on a projection lens 2114. The projection lens 2114 enlarges and projects the combined image onto a screen Scr.

Note that the transmitted images formed by the electro-optical devices 100R and 100B are projected after being reflected by the dichroic prism 2112, whereas the transmitted image formed by the electro-optical device 100G travels straight and is projected. Therefore, the transmitted images by the electro-optical devices 100R and 100B are in a relationship of being laterally inverted with respect to the transmitted image of the electro-optical device 100G.

Further, the projection-type display apparatus 200 is exemplified here as the electronic apparatus. However, the present disclosure is not limited thereto. For example, the present disclosure can also be applied to a display panel of a head mounted display, an electronic viewfinder in a video camera, a lens-interchangeable digital camera, or the like, a display unit of a portable information terminal, a wristwatch, or the like.

The following aspects, for example, can be ascertained from the above-described embodiments.

In order to solve the above-mentioned problem an electro-optical device according to an aspect of the present disclosure includes a plurality of data lines including k data lines being grouped, k being an integer equal to or greater than 2, a data signal line to which a data signal according to gradation of a pixel is supplied, in a time-division manner, corresponding to the k data lines, k selection signal lines to each of which a selection signal is supplied, k inversion selection signals to each of which an inversion selection signal of the selection signal is supplied, the k inversion selection signal lines forming pairs with the k selection signal lines, a first switching element being provided corresponding to the plurality of data lines in an one-on-one manner, being in an on state or an off state between the data signal line and one data line, according to a selection signal supplied to one selection signal line among the k selection signal lines, and a constant potential wiring line overlapping with the k selection signal lines and the k inversion selection signal lines in plan view and being maintained at a predetermined potential.

According to the electro-optical device according to the first aspect, the noise superimposed onto the constant potential wiring line due to the potential fluctuation of the selection signal line is canceled out by the noise caused by the potential fluctuation of the inversion selection signal line. Thus, the potential fluctuation of the constant potential wiring line can be suppressed. Note that cancellation of original noise by different noise refers to a situation where noise in a direction opposite to the original noise is generated to offset the original noise.

Note that the light shielding film 160 is an example of the "constant potential wiring line", and the transistor N1 is an example of the "first switching element".

In the electro-optical device according to a second aspect being a specific aspect of the first aspect, the constant potential wiring line has a light shielding property, and the constant potential wiring line surrounds a display region in which a plurality of pixel circuits are arrayed, in plan view. According to the electro-optical device according to the second aspect, entry of stray light into the display region can be prevented.

The electro-optical device according to a third aspect being a specific aspect of the second aspect further includes a scanning line, wherein the pixel circuit includes a second switching element, an electro-optical element, and a storage capacitor, the second switching element is in an on state or an off state between the data line and one end of the electro-optical element, according to a potential of the scanning line, the electro-optical element has an optical property according to a voltage at the one end and the other end, the storage capacitor retains a voltage at the one end of the electro-optical element, and the constant potential wiring line and the other end of the storage capacitor are electrically coupled to each other.

According to the electro-optical device according to the third aspect, the potential applied to the constant potential wiring line can be shared as the potential applied to the other end of the storage capacitor, and the potential fluctuations at the constant potential wiring line and the other end of the storage capacitor can be suppressed. Thus, degradation of display quality due to the potential fluctuations can be suppressed.

Note that the liquid crystal element 120 is an example of the "electro-optical element", the transistor 116 is an example of the "second switching element", and the capacitance wiring line 140 is an example of the "other end of the storage capacitor".

In the electro-optical device according to a fourth aspect being another specific aspect of the first aspect, the first switching element is a P-channel transistor or an N-channel transistor. According to the electro-optical device according to the fourth aspect, the configuration can be simplified.

The electro-optical device according to a fifth aspect being a specific aspect of the fourth aspect further includes an NOT circuit provided corresponding to the plurality of data lines in one-one-one manner, wherein the first switching element is the N-channel transistor, the NOT circuit corresponding to one data line among the plurality of data lines inverts a logic level of an inversion selection signal supplied to one inversion selection signal line among the k inversion selection signal lines, and a merged signal is supplied to a gate node of the N-channel transistor, the merged signal being a combination of an inversion signal supplied to one selection signal line forming a pair with the one inversion selection signal line and an output signal of the NOT circuit corresponding to the one data line.

Note that the first switching element may be a P-channel transistor. Specifically, the electro-optical device includes an NOT circuit provided corresponding to the plurality of data lines in one-one-one manner, wherein the first switching element is the P-channel transistor, the NOT circuit corresponding to one data line among the plurality of data lines inverts a logic level of a selection signal supplied to one selection signal line among the k selection signal lines, and a merged signal is supplied to a gate node of the P-channel transistor, the merged signal being a combination of an signal supplied to one inversion selection signal line forming a pair with the one selection signal line and an output signal of the NOT circuit corresponding to the one data line.

In the electro-optical device according to a sixth aspect being another specific aspect of the first aspect, the first switching element is a transmission gate obtained by combining a P-channel transistor and an N-channel transistor. According to the electro-optical device according to the sixth aspect, the data signal supplied to the data signal line can be sufficiently written to the data line, and display unevenness due to the difference in the write polarity can be suppressed.

The electro-optical device according to a seventh aspect being a specific aspect of the sixth aspect further includes an NOT circuit provided corresponding to the plurality of data lines in one-on-one manner, wherein a selection signal supplied to one selection signal line among the k selection signal lines is supplied to a gate node of an N-channel transistor in the first switching element corresponding to one data line among the plurality of data lines, and the NOT circuit corresponding to the one data line inverts a logic level of a selection signal supplied to the one selection signal line, and supplies the selection signal to a gate node of a P-channel transistor in the first switching element corresponding to the one data line and an inversion selection signal line forming a pair with the one selection signal line.

An electronic apparatus according to an eighth aspect includes the electro-optical device according to any one of the first to seventh aspects.

What is claimed is:

1. An electro-optical device comprising:

a plurality of data lines including k data lines being grouped, k being an integer equal to or greater than 2;

a data signal line to which a data signal according to gradation of a pixel is supplied, in a time-division manner, corresponding to the k data lines;

k selection signal lines to each of which a selection signal is supplied;

k inversion selection signals to each of which an inversion selection signal of the selection signal is supplied, the k inversion selection signal lines forming pairs with the k selection signal lines;

a first switching element being provided corresponding to the plurality of data lines in an one-on-one manner, being in an on state or an off state between the data signal line and one data line, according to a selection signal supplied to one selection signal line among the k selection signal lines; and a constant potential wiring line overlapping with the k selection signal lines and the k inversion selection signal lines in plan view and being maintained at a predetermined potential.

2. The electro-optical device according to claim 1, wherein the constant potential wiring line has a light shielding property, and the constant potential wiring line surrounds a display region in which a plurality of pixel circuits are arrayed, in plan view.

3. The electro-optical device according to claim 2, further comprising:

a scanning line, wherein the pixel circuit includes a second switching element, an electro-optical element, and a storage capacitor, the second switching element is in an on state or an off state between the data line and one end of the electro-optical element, according to a potential of the scanning line, the electro-optical element has an optical property according to a voltage at the one end and an other end of the electro-optical element, the storage capacitor retains a voltage at the one end of the electro-optical element, and the constant potential wiring line and an end of the storage capacitor are electrically coupled to each other.

4. The electro-optical device according to claim 1, wherein the first switching element is a P-channel transistor or an N-channel transistor.

5. The electro-optical device according to claim 4, further comprising:

an NOT circuit provided corresponding to the plurality of data lines in one-one-one manner, wherein the first switching element is the N-channel transistor, the NOT circuit corresponding to one data line among the plurality of data lines inverts a logic level of an inversion selection signal supplied to one inversion selection signal line among the k inversion selection signal lines, and a merged signal is supplied to a gate node of the N-channel transistor, the merged signal being a combination of an inversion signal supplied to one selection signal line forming a pair with the one inversion selection signal line and an output signal of the NOT circuit corresponding to the one data line.

6. The electro-optical device according to claim 1, wherein the first switching element is a transmission gate obtained by combining a P-channel transistor and an N-channel transistor.

7. The electro-optical device according to claim 6, further comprising:

an NOT circuit provided corresponding to the plurality of data lines in one-on-one manner, wherein a selection signal supplied to one selection signal line among the k selection signal lines is supplied to a gate node of the N-channel transistor in the first switching element corresponding to one data line among the plurality of data lines, and the NOT circuit corresponding to the one data line inverts a logic level of a selection signal supplied to the one selection signal line, and supplies the selection signal to a gate node of the P-channel transistor in the first switching element corresponding to the one data line and an inversion selection signal line forming a pair with the one selection signal line.

8. An electronic apparatus comprising the electro-optical device according to claim 1.

* * * * *